US012762555B2

(12) United States Patent
Horowitz et al.

(10) Patent No.: US 12,762,555 B2
(45) **Date of Patent: *Oct. 13, 2026**

(54) REMOTE PRINTING FOR CUSTOMIZED CHEMICAL MIXING

(71) Applicant: Wild Flower Holdings Inc., New York, NY (US)

(72) Inventors: Kari Horowitz, New York, NY (US); Neal Pomroy, Cos Cob, CT (US); David Wildenstein, Wellington, FL (US)

(73) Assignee: Wild Flower Holdings Inc., New York, NY (US)

( * ) Notice: Subject to any disclaimer, the term of this patent is extended or adjusted under 35 U.S.C. 154(b) by 1047 days.

This patent is subject to a terminal disclaimer.

(21) Appl. No.: 17/705,891

(22) Filed: Mar. 28, 2022

(65) Prior Publication Data

US 2023/0267462 A1 Aug. 24, 2023

Related U.S. Application Data

(63) Continuation-in-part of application No. 17/678,956, filed on Feb. 23, 2022, now Pat. No. 12,369,621, and (Continued)

(51) Int. Cl.

| | |
|---|---|
| ***G06Q 20/40*** | (2012.01) |
| ***A24B 15/167*** | (2020.01) |
| ***A24D 1/02*** | (2006.01) |
| ***B01F 35/22*** | (2022.01) |
| ***C12G 3/06*** | (2006.01) |
| ***G06Q 20/02*** | (2012.01) |

(52) U.S. Cl.

CPC ......... *G06Q 20/401* (2013.01); *A24B 15/167* (2016.11); *A24D 1/025* (2013.01); *B01F 35/2205* (2022.01); *C12G 3/06* (2013.01); *G06Q 20/02* (2013.01)

(58) Field of Classification Search

USPC ........................................................ 705/26.9

See application file for complete search history.

(56) References Cited

U.S. PATENT DOCUMENTS

| | | | | |
|---|---|---|---|---|
| 9,155,337 | B2 * | 10/2015 | Duncan .................. | A24F 40/40 |
| 10,206,888 | B2 | 2/2019 | Vu et al. | |

(Continued)

OTHER PUBLICATIONS

U.S. Appl. No. 17/678,956, Non-Final Office Action mailed Dec. 17, 2024, 15 pages.

(Continued)

*Primary Examiner* — Jacob T Minskey

(74) *Attorney, Agent, or Firm* — Conley Rose, P.C.

(57) ABSTRACT

In remotely rendering chemical signatures, a remote request received from a user comprises a requesting user identifier, a substrate specification, and a chemical signature. The chemical signature includes identifiers for one or more chemicals comprising a selected set of chemicals, and for each identified chemical at least a quantity of the selected set of chemicals. The received remote request is directed to a chemical printer that prints chemicals on the substrate based at least on the chemical signature. The printed substrate may be tagged with a predetermined digital tag format based at least on the requesting user identifier.

19 Claims, 12 Drawing Sheets

Related U.S. Application Data a continuation-in-part of application No. 17/678,981, filed on Feb. 23, 2022, now abandoned, which is a continuation-in-part of application No. 17/678,956, filed on Feb. 23, 2022, now Pat. No. 12,369,621, application No. 17/705,891 is a continuation-in-part of application No. 17/683,181, filed on Feb. 28, 2022, now Pat. No. 12,280,999, which is a continuation-in-part of application No. 17/678,956, filed on Feb. 23, 2022, now Pat. No. 12,369,621, application No. 17/705,891 is a continuation-in-part of application No. 17/691,026, filed on Mar. 9, 2022, which is a continuation-in-part of application No. 17/678,956, filed on Feb. 23, 2022, now Pat. No. 12,369,621, and a continuation-in-part of application No. 17/678,981, filed on Feb. 23, 2022, now abandoned, which is a continuation-in-part of application No. 17/678,956, filed on Feb. 23, 2022, now Pat. No. 12,369,621, said application No. 17/691,026 is a continuation-in-part of application No. 17/683,181, filed on Feb. 28, 2022, now Pat. No. 12,280,999, which is a continuation-in-part of application No. 17/678,956, filed on Feb. 23, 2022, now Pat. No. 12,369,621.

(56) References Cited

U.S. PATENT DOCUMENTS

| | | | | |
|---|---|---|---|---|
| 10,897,925 | B2 | 1/2021 | Pandolfino | |
| 2009/0008407 | A1 | 1/2009 | Sevcik et al. | |
| 2009/0069932 | A1 | 3/2009 | Rudick | |
| 2015/0251891 | A1 | 9/2015 | Peters et al. | |
| 2016/0368753 | A1 | 12/2016 | Bethuy et al. | |
| 2018/0257306 | A1* | 9/2018 | Mattingly | B33Y 50/00 |
| 2020/0202409 | A1 | 6/2020 | Jikomes et al. | |
| 2021/0307378 | A1 | 10/2021 | Rabie | |
| 2021/0390531 | A1* | 12/2021 | Voorhees | G06Q 20/367 |
| 2021/0397758 | A1 | 12/2021 | Haeni et al. | |

OTHER PUBLICATIONS

U.S. Appl. No. 17/683,181, Notice of Allowance mailed Dec. 18, 2024, 12 pages.
U.S. Appl. No. 17/683,181, Non-Final Office Action mailed Jun. 10, 2024, 9 pages.
U.S. Appl. No. 17/678,956, Restriction Requirement mailed Sep. 5, 2024, 6 pages.
U.S. Appl. No. 17/678,956, Notice of Allowance mailed Apr. 8, 2025, 8 pages.

* cited by examiner

200

700

800

LUT 1100

| Cartridge Labels 1110 | Base Flavor 1120 | Target Flavors 1130 | Chemical Signatures 1140 |
|---|---|---|---|
| First Label 1112 | Tobacco Flavor 1122 | Medium Strength Tobacco 1132 | 70% TCH Formulations 1142 |
| | | High Strength Tobacco 1134 | 70% TCH Printed Dissolvable Substrate 1144 |
| Second Label 1114 | Mint Flavor 1124 | Medium Strength Selection Mint 1136 | 70% TCH Formulations 1146 |
| | | High Strength Mint 1138 | 70% TCH Printed Dissolvable Substrate 1148 |

Figure 11

REMOTE PRINTING FOR CUSTOMIZED CHEMICAL MIXING

CROSS-REFERENCE TO RELATED APPLICATIONS

This application is:

a continuation-in-part of U.S. patent application Ser. No. 17/678,956, filed on Feb. 23, 2022 entitled "Customizable Printable Solutions for Delivery of Inhalants;"

a continuation-in-part of U.S. patent application Ser. No. 17/678,981, filed on Feb. 23, 2022 entitled "Customizable Inhalants for Vaping," which is a continuation-in-part of U.S. patent application Ser. No. 17/678,956, filed on Feb. 23, 2022;

a continuation-in-part of U.S. patent application Ser. No. 17/683,181, filed on Feb. 28, 2022 entitled "Customizable Beverages," which is a continuation-in-part of U.S. patent application Ser. No. 17/678,956, filed on Feb. 23, 2022; and a continuation-in-part of U.S. patent application Ser. No. 17/691,026, filed on Mar. 9, 2022 entitled "Chemical Signature Manager," which is

- a continuation-in-part of U.S. patent application Ser. No. 17/678,956, filed on Feb. 23, 2022;
- a continuation-in-part of U.S. patent application Ser. No. 17/678,981, filed on Feb. 23, 2022, which is a continuation-in-part of U.S. patent application Ser. No. 17/678,956, filed on Feb. 23, 2022; and
- a continuation-in-part of U.S. patent application Ser. No. 17/683,181, filed on Feb. 28, 2022, which is a continuation-in-part of U.S. patent application Ser. No. 17/678,956, filed on Feb. 23, 2022;

the contents of all of the above-noted applications are hereby incorporated by reference herein in their entireties.

BACKGROUND

Three common ways to consume substances are to smoke, vape, or drink those substances. Smoking can include burning a cigarette or cigar that has a base substrate containing one or more active ingredients by which the active ingredients are converted into an inhalant as "smoke", followed by the inhalation of the resulting smoke. Vaping may involve heating in an "electronic cigarette" a liquid in a container such as a cartridge or tank to produce an aerosol, often called vapor, made of particulate matter; or a substrate with a wick that produces a flavor when heated, followed by the inhalation of the resulting vapor. Drinking is to take liquid into the body via the mouth.

SUMMARY

Presently, the use of inhalants derived from plant materials via smoking or vaping is common for both medicinal and recreational use. For example, various blends of strains of grown *Cannabis* and related substances when smoked, are associated with experiences. Those experiences may include not only sensory effects such as taste and smell but also pharmacological effects. By way of another example, tobacco products are sometimes blended to deliver the desired set of sensory effects. However, such blends may be costly and/or difficult to obtain.

Beverages, for example alcoholic beverages, that are sold commercially may also be produced from plant materials. Users consuming these substances may experience not only sensory effects such as taste and smell, but also pharmacological effects. By way of another example, inhalants, brewed beverages, and distilled beverages are sometimes blended to deliver a desired set of sensory effects. However, such blends may be costly and/or difficult to obtain.

In some examples, various blends of strains of grown *Cannabis* and related substances, when inhaled or ingested, are associated with sensory effects. As described herein, *Cannabis* is a genus of flowering plants that include the species: *Cannabis sativa, Cannabis indica*, and *Cannabis ruderalis. Cannabis* has long been used for hemp fibers, seed and seed oils, medicinal purposes, and recreational purposes. Cannabidiol, better known as "CBD," is one of the chemical compounds called "cannabinoids" that are found in the *Cannabis sativa* plant. The *Cannabis sativa* plant may also include terpenes, which are common compounds in the natural world. Terpenes are responsible for the smell of many plants. The terpenes may act on the endocannabinoid system in the human body in a similar way to the cannabinoids.

An arbitrary blend of substances can be characterized as a set of chemicals and their associated amounts. A need may arise to specify a known blend by such a set of chemical amounts, and subsequently to mechanically generate those chemicals using less costly and/or more readily available materials to closely match at least some of the experiences of the characterized arbitrary blend.

While these targeted experiences may be successfully created by specific strain selection and specific preparation methods, the strains may be difficult or expensive to obtain and the specific preparation methods may be unknown. However, the resulting product from the strains and preparation methods, such as a cigarette, vaping cartridge, or beverage, can be considered a mere set of chemicals that correspond to the targeted experience. Where that set of chemicals is to be reproduced via other (preferably easier to source and less expensive) feedstock, the targeted experience may be reproduced as well.

Herein are disclosed techniques to reproduce a targeted experience. Specifically, techniques to infuse a substrate, such as a flammable substrate for a cigarette paper or a dissolvable substrate for a vaping device or beverage, with chemicals corresponding to a targeted experience are among those disclosed. Some of the techniques may include use of a mechanical printer as the method of infusion.

There are many variations of smokable filler, such as tobacco, forms of *Cannabis*, or coconut husk, to name three. Similarly, there are many different kinds of liquids that can be atomized for vaping, and many kinds of beverages. Note that the materials in each case are themselves sets of chemicals. Techniques to create a chemical signature, i.e., a set of chemicals and characteristics of each respective chemical, such as an amount that take into account the amount of the substrate; the filler, liquid, or beverage; and/or fixative agents, as to reproduce a targeted experience are also disclosed.

In one example, the printed substrate may be used to roll filler for a cigarette. Examples of filler may be active ingredients such as strains of *Cannabis* and/or tobacco, and/or neutral fillers such as corn husk, grass, and coconut husk. Upon rolling filler with the printed substrate, the combination yields a final product. The final product when consumed may then yield a targeted experience, subject to a tolerance in some embodiments.

In another example, the vaping apparatus may utilize the chemical signature as a reference for injecting predetermined dosages of one or more pre-vapor formulations into a chamber of the vaping apparatus. The vaping apparatus may then apply heat to a combination of the base flavor and the pre-vapor formulations in the chamber to generate the targeted flavor. This technique of on-demand customization of inhalants may improve the vaping experience and reduce the cost of vaping by dynamically adjusting the amount of chemicals to be added to the base flavor depending on a target experience or flavor.

In yet another example, alcoholic beverages, including brewed and distilled beverages, that are sold commercially also may be produced from plant materials. After a brewing or distillation process, each product may include distinct aromas and flavors, which can reflect raw materials that were used, method of brewing or distillation process performed, and/or post-brewing and -distillation treatments made on the product. Flavor compounds in alcoholic beverages may be referred to as congeners. Different alcoholic beverages may have small differences in congener levels but have large differences in flavor and aroma intensities. Examples of enhancements of alcoholic beverages may include aggregating raw materials of tobacco, alcohol, and similar products and then mechanically mixing the aggregated raw materials into the beverages. These types of distilled beverages may be combined to come up with different flavors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 11 is an example look-up table (LUT) that can be used as a reference by the vaping apparatus or the chemical signature engine server for generating a chemical signature, in accordance with at least one embodiment

DETAILED DESCRIPTION

Figure 1:
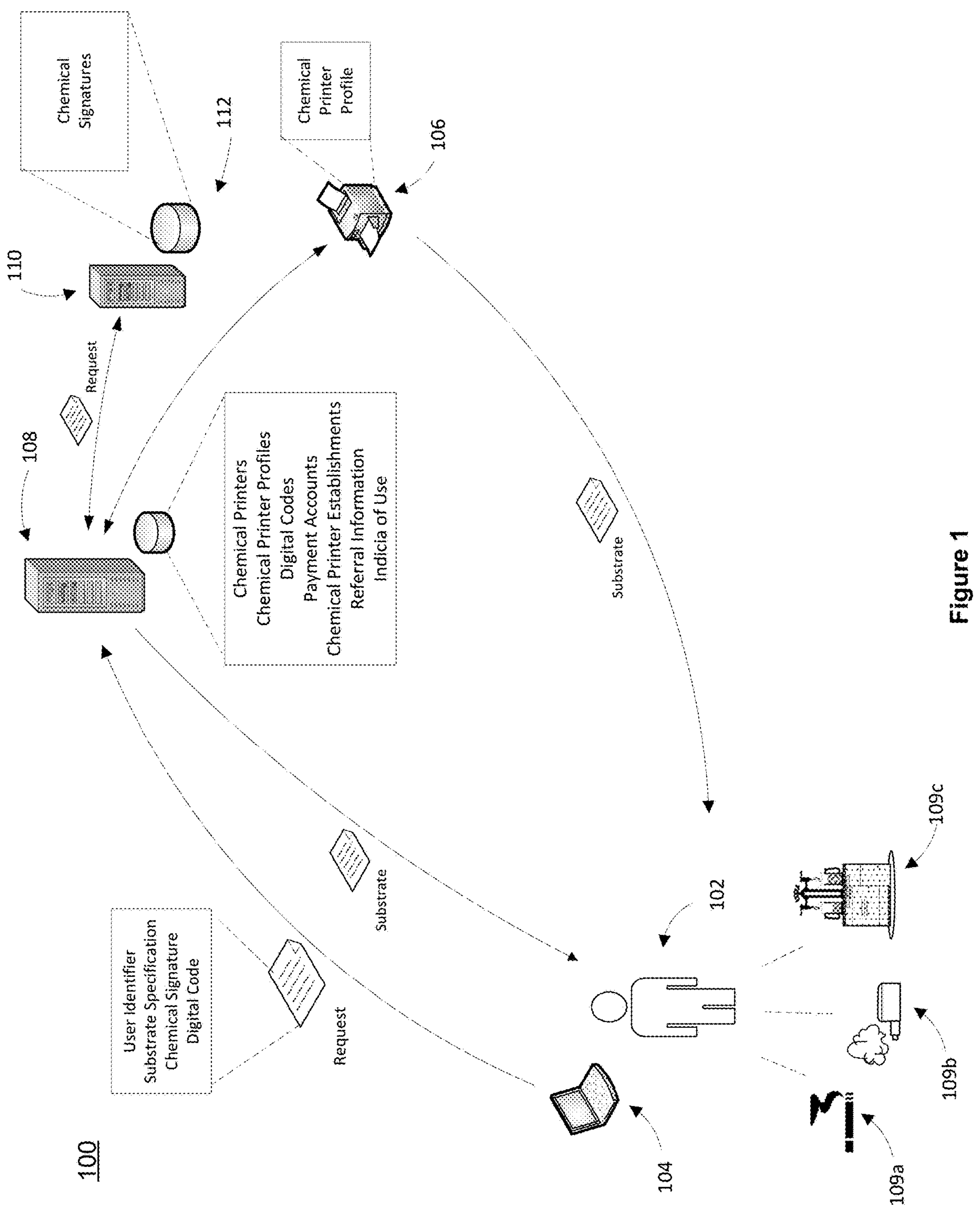
FIG. 1 is a context diagram for an example of remote printing for customized chemical mixing.

Historically, people have prepared various plant products, including tobacco and *Cannabis*, and dried and cured various strains of those products for smoking. In some instances, smoking involves burning the cured products, thereby creating inhalants for ingestion. In this way, smoking is known as a method of delivery of inhalants.

While initial reasons for smoking may have included pharmaceutical effects, people have taken to optimizing the holistic experience of smoking. This includes selecting specific strains and applying specific preparation methods to create a targeted experience. The experience of ingesting these selected strains includes not only a specific pharmaceutical effect, but also sensory experiences including taste and smell. For example, flavorings such as menthol and mint have been added to mask the harshness of tobacco. By way of another example, strains have been bred for targeted concentrations of active pharmaceutical chemicals. Thus, a targeted experience may refer to the sum of one or more of the sensory, pharmaceutical, and other physical effects, resulting from consuming, via smoking, material comprised of a set of chemicals in associated amounts. Techniques for performing an on-demand customization of inhalants to improve the smoking experience are disclosed herein.

Techniques for performing an on-demand customization of inhalants to improve a vaping experience are also disclosed herein. These techniques may include showing a selection of target flavors via a user interface of a vaping apparatus, comparing chemical components of a user-selected target flavor with a base flavor, and receiving a chemical signature based at least in part upon a comparison between the target flavor and the base flavor. The chemical signature may be received by the vaping apparatus from a server. The base flavor may be associated with a wick that produces a flavor when heated. The produced flavor (or base flavor) may include, without limitation, tobacco, mint, mango, tropical fruit, cola, or other flavors, for example. The target flavor may include a combination of the base flavor and additional chemicals such as, without limitation, predetermined dosages of *Cannabis*, terpenes, or a suitable combination thereof. In one example, the vaping apparatus may utilize the chemical signature as a reference for injecting predetermined dosages of one or more pre-vapor formulations into a chamber of the vaping apparatus. The vaping apparatus may then apply heat to a combination of the base flavor and the pre-vapor formulations in the chamber to generate the targeted flavor. This technique of on-demand customization of inhalants may improve the vaping experience and reduce the cost of vaping by dynamically adjusting the amount of chemicals to be added to the base flavor depending on a target experience or flavor.

Without limitation, the chemical signature may include information that identifies dosages, types, and/or other data associated with the chemicals to be used for generating a flavor change. The information may further identify a method, timing of injecting the pre-vapor formulations to the chamber, and/or threshold values such as an airflow pressure threshold that can be used as a reference to activate a heating element in the vaping apparatus. In one embodiment, the chemical signature is based upon a comparison between chemical components of the base flavor of the vaping apparatus and the selected target flavor. For example, the comparison may result in adding a particular dosage of cannabidiol or a terpene to a tobacco-base flavor during vaping. In this example, the additional particular dosage may be treated as a difference between the target flavor and the base flavor.

This disclosure also describes techniques for performing an on-demand customization of beverages to improve the drinking experience. In some embodiments, the beverage is an alcoholic beverage, although concepts described herein may be applicable to other beverages. For example, the techniques may include receiving a target flavor (e.g., from a selection of a target flavors received via a user interface) of a beverage dispenser, comparing chemical components of the target flavor with a base flavor, and receiving a chemical signature based at least in part upon a comparison between the target flavor and the base flavor. In some examples, the beverage may include at least a liqueur. The chemical signature may be received by the beverage dispenser from a server. In some examples, the base flavor may be associated with distilled beverages that include, without limitation, gin, tequila, vodka, whiskey, or rum. The target flavor may include a combination of the beverages and additional chemicals such as, without limitation, predetermined dosages of *Cannabis*, terpenes, or a suitable combination thereof. In one example, the beverage dispenser may utilize the chemical signature as a reference for injecting one or more formulations into a dispenser line that supplies the beverages from their corresponding kegs (or other container) to a beverage dispenser tower (or faucet). In this example, a mixture of the beverages and the formulations in the dispenser line may generate a combination that creates the selected or targeted flavor. This technique of on-demand customization of the beverages may improve the drinking experience and reduce the cost of drinking flavors by dynamically adjusting the amount of chemicals to be added to the base flavor as needed for an enhanced drinking experience.

Without limitation, the chemical signature may include information that identifies dosages, types, and/or other data associated with the formulations to be used for generating/creating the flavor or flavor change. The information may further identify a method or timing of injecting the formulations to the dispenser line. In one embodiment, the chemical signature can be based upon a comparison between chemical components of the base flavor and the selected flavor. For example, the comparison may result in adding a dosage of cannabidiol or a terpene to the distilled beverages. Here, the selected flavor may include additional dosages of cannabidiol, terpene, and/or tobacco.

Details regarding the novel products and techniques referenced above and presented herein are described in detail, below, with respect to several figures that identify elements and operations used in systems, devices, methods, and computer-readable storage media that implement the techniques. Some embodiments are described of generating flavors for cigarettes, vaping apparatuses, and beverages.

FIG. 1 is a context diagram 100 for an example of remote printing for customized chemical mixing. In the example shown in FIG. 1, a user 102 has a user device 104 and access to a chemical printing service having a chemical printer 106 via a computing device, such as or including a server 108. The chemical printing service may be a business entity that includes the server 108 and chemical printer 106, or may be engaged via the server 108 as part of a separate entity. In some embodiments, the access is a remote access, wherein the user 102 does not have a local chemical printer and thus must enlist the services of the remote chemical printer 106. A substrate printed by the chemical printer 106 may be delivered by the chemical printing service directly to the user 102 or via the server 108 or other intermediar(ies) for application to a product such as, and without limitation, a cigarette 109*a*, a vaping apparatus 109*b*, and/or a beverage dispenser 109*c*.

The chemical printer 106 may be provided with chemicals that it can infuse into a base substrate via piezoelectric, thermal, or equivalent printing techniques. In some embodiments, the base substrate may be flammable or dissolvable. Examples include, but are not limited to, cigarette paper. The chemicals may include active ingredients such as tetrahydrocannabinol, cannabidiol, terpenes, or oils. Other chemicals may include flavorings such as mint and menthol. Still other chemicals may include fixative agents or preservatives. The chemical printer 106 is described in further detail with respect to FIG. 4 below.

The server 108 may communicatively access a chemical signature database engine 110, which may be a software database engine server. The chemical signature database engine 110 may be connected to a data store that contains a chemical signature database 112. The chemical signature database 112 may contain at least a plurality of chemical signatures, each comprised of a set of identifiers for various chemicals. Each chemical in a chemical signature may be associated in the chemical signature database 112 with an amount of the chemical and other data. When received by the chemical printer 106, the chemical printer may select chemicals corresponding to the identifiers in the signature and subsequently print quantities of the selected chemicals into a substrate according to the chemical signature. Chemical signatures are described in further detail with respect to FIG. 2 below.

The chemical signature database engine 110 and chemical signature database 112 may both be remote from the user device 104, accessible, e.g., via the Internet or other network, and/or may be resident in a cloud installation. Examples of the hardware, software, and communications infrastructure are described in more detail with respect to FIG. 3 below.

To effect remote printing for customized chemical mixing, the user 102, via the user device 104, may create a request for a chemical signature and transmit the request to the server 108, which may forward the request to the chemical signature database engine 110. In some embodiments, the request may include an identifier of the user 102, an identifier and/or specification for a substrate, and/or a chemical signature that comprises identifiers for one or more chemicals. The request may also include a digital code, such as a credential in a token or key that can be validated, that indicates a right to use the chemical signature in the request. Furthermore, the digital code may take be a non-fungible token (NFT) of the chemical signature. The chemical signature may comprise a compilation of individually identified chemicals or a defined set of chemicals (identified in a predefined set or individually in the request), and for each identified chemical at least a quantity of that chemical in the set. The request may instead include a brand name or other indicator for a desired set of chemicals, without specifying the chemicals individually. For example, if a user is aware of a particular blend of *Cannabis* X, it can specify a brand name for X to obtain printing in accordance with the chemical signature for X.

The chemical signature database engine 110 may retrieve the requested chemical signature and return the same to the server 108, which may then transmit the chemical signature to the chemical printer 106. In some embodiments, forwarding the request and/or choosing the chemical printer may be contingent on a successful validation of the digital code, if present. Indeed, the forwarding of the request may not be performed at all if the digital code is not validated or is needed but not present.

Validation may be made against a data store of digital codes, for example by the server 108. The digital codes may be stored in a data store as part of the server, or accessible by the server 108 from an external data store. Examples of validation may include any of a variety of verifications based on information that may be partially or wholly contained in the digital code or elsewhere in the request, such as, and without limitation, verifying the purchase of the chemical signature in the request, verifying payment for the chemical signature or presence of an active subscription to make the request, verifying the transfer of the chemical signature in the request, or verifying that the chemical signature is a modification of a second chemical signature and that the user identifier is associated with rights to use the second chemical signature (and thus the requested chemical signature by extension). In some embodiments, the user identifier may be or need to be associated with a verifiable payment account that can be debited by the cost of obtaining the printed substrate before the request is forwarded to the chemical printer 106, whereby the forwarding is contingent on the presence of an associated account and funds available for debiting.

In some embodiments, the chemical signature determines which chemical printer or printers 106 to receive the chemical signature based on the contents of the received request and a chemical profile associated with each chemical printer 106. A printer's chemical profile, for example, may include, among other things, the chemicals that the chemical printer 106 is configured to print. In some embodiments, the chemical profile may include the amount of each chemical that the chemical printer 106 holds or can obtain for printing; in others, the printer's inventory may not be part of the chemical profile. For example, the server 108 may have or obtain information on the ingredients that each chemical printer 106 stocks at the time of printing, and send the chemical signature to the chemical printer or printers 106 that have the needed ingredients rather than to a printer that is unable to fill the request. In some embodiments, the server 108 may monitor the chemical stock of the chemical printer (s) 106 or obtain that information from the printers or another source.

In response to a request for a printed substrate to use in creating a smoking, vaping, or beverage product, the chemical printer(s) 106 receiving the request may print the chemicals on the specified substrate in accordance with the chemical signature, which can be used to create a targeted flavor in a cigarette 109*a*, vaping apparatus 109*b*, or beverage dispenser 109*c*. The printed substrate may be tagged with a predetermined digital tag format based at least on the requesting user identifier. In some embodiments, the tag may identify the requesting user. Other information may be included in the tag as desired. For example, the request may be associated with a digital code, either in the request itself or added by the server 108 or at another point in the transmission. The digital code may be the same as or different from the digital code used for validation of the request. The digital code in the tag may be scanned by the server 108 or another device and/or human in the sending of the printed substrate to the user. The digital code may be formatted according to the digital tag format and compared by the server 108, the chemical printer 106, and/or another entity against the tagged printed substrate for verification that the printed substrate is being sent to the proper party based on the association between the digital code and the request. The chemical printer 106, the server 108, or other entity verifying the comparison may then send a signal that the tagged printed substrate may be delivered if the digital code scan is successfully compared against the tagged printed substrate.

In the case of printing the chemical signature for use by the beverage dispenser 109*c*, the beverage may be pumped via a dispenser line that connects a keg or other container for the beverage to a tap or faucet. During the pumping of the beverage, one or more flavors may be injected into the dispenser line and mixed with the beverage. For example, the printed substrate obtained from the remote chemical printer may be a dissolvable substrate that can be inserted and/or dissolved into the dispenser line to mix/combine with the beverage. In this example, the chemical printer 106 may print one or more layers of ink on a dissolvable substrate to generate the printed dissolvable substrate that is associated with a flavor. In one embodiment, the ink may include a composition that can be obtained via a combination of formulations that are associated with one or more flavors.

It may not be enough to merely retrieve a chemical signature for X. For example, a fixative agent (used to ensure the printed chemicals are not easily removed from the substrate), composition of the substrate, and/or filler to be used may need to be specified. Although it is conceivable that one or more of these items may be identified by the user 102, in some embodiments these details may need to be predetermined by another entity, such as in the event that there are no options for a particular component, or the user is unable to make the specification. For example, it may be unnecessary to specify the form of the substrate needed by the user's device (e.g., a flammable substrate for a cigarette), or the server 108, user device 104, or chemical printer 106 may make the selection (e.g., a particular formulation may require a larger substrate). One or more of these ingredients may be selectable separately or in concert with the indication and retrieval of the chemical signature in some embodiments. The chemical signature database engine 110 may then retrieve the chemical signature modified by the chemical signatures of the fixative agent, substrate, and/or filler in this example. In this way, the retrieved chemical signature may take into account the other ingredients in the final product, and thereby achieve the intended targeted experience.

In some embodiments, the user device 104 and/or the chemical printer 106 may have the capability to modify chemical signatures, and the user 102 merely retrieves the chemical signature. In this scenario, the user device 104 may receive the chemical signature and modify the chemical signature to account for the specified fixative agent, substrate, and/or filler.

In other embodiments, the user 102 may specify custom modifications to the chemical signature. This may be performed on the user device 104 by a chemical signature editor (not shown). Example modifications may be to increase the amount of active chemicals and/or to add flavorings. In this way, a user 102 may customize a targeted experience.

Flavorings may, in some embodiments, be created by combining a base flavor with one or more other flavors present in the chemical signature. For example, flavors may each contain certain dosages of *Cannabis*, terpenes, or a suitable combination thereof. In this way, a flavor desired for enhancing an inhalant or beverage may be dynamically varied or generated on demand. This technique of customizing may improve the user experience and can in some instances be a cheaper way to dynamically add *Cannabis*, terpenes, etc. to inhalants or beverages.

Regardless of whether the chemical signature database engine 110 or the user device 104 modifies the chemical signature or the user customizes the chemical signature, the modified chemical signature is sent to the chemical printer 106, which prints the chemicals specified in the signature onto the substrate. Along with the chemicals specified in the signature, the chemical printer 106 may also print fixative agents, flavorings, preservatives, and/or other additives.

In some embodiments related to cigarette creation, after printing, the printed substrate may be used to roll filler to create the cigarette 109*a*. Examples of filler may be active ingredients such as strains of *Cannabis* and/or tobacco, and/or neutral fillers such as corn husk, grass, and coconut husk. Upon rolling filler with the printed substrate, the combination yields a final product. The final product when consumed may then yield a targeted experience, subject to a tolerance in some embodiments. Tolerances are described in further detail with respect to FIG. 2 below.

In embodiments related to vaping products, the printed substrate may provide a roll of printed dissolvable substrate that can be inserted into the chamber of the vaping apparatus 109*b*. For example, a base flavor may be obtained via a wick that can be positioned and/or inserted into a replaceable cartridge to absorb an oil. One or more nozzles are in fluid communication with pre-vapor formulations to inject chemical components into the chamber of the vaping apparatus. The wick may include suitable materials which can be used to absorb oil and other chemicals from one or more reservoirs or chambers of the vaping apparatus. In one example, a vaporizing heater may apply a particular amount of heat to the replaceable cartridge to vaporize the oil resulting in a generation of the base flavor. The vaporizing heater may include a wire coil that transfers heat to incoming ambient air that can be drawn through chamber vent holes during vaping, which in turn heats the wick, oil, injected pre-vapor formulations, and/or the printed dissolvable substrate by convection.

The insertion to expose the printed dissolvable substrate may be done manually via a knob or through a roller that inserts the printed dissolvable substrate in increments to the chamber. The printed dissolvable substrate may be subdivided using perforated substrates where each section may correspond to a dosage that can be combined with the base flavor to generate the targeted flavor. For example, each dosage may be identified through a perforation of the printed substrate. In some instances, each increment in the vaping apparatus or knob step may be preconfigured to insert a particular dosage into the chamber.

In some embodiments related to dispensing an enhanced beverage using techniques described herein, the printed dissolvable substrate may be inserted in increments, for example, into the dispenser line of the beverage dispenser 109*c*. For example, the beverage dispenser 109*c* may include one or more processors and software instructions stored in memory which, when executed by the one or more processors, may control the dosage or amount of chemicals of the printed dissolvable substrate to be combined with the base flavor in the dispensing line to generate the targeted flavor. In one example, the printed dissolvable substrate may be dissolved by exposing a portion of the substrate in the dispenser line. The printed dissolvable substrate may be inserted and exposed in increments in the dispenser line where each increment may correspond to a subdivided individual dose of the printed dissolvable substrate. The insertion to expose the printed dissolvable substrate to be combined with the base flavor in the dispensing line to generate the targeted flavor may be done automatically or manually via a knob (not shown) or through a roller (not shown) that inserts the printed dissolvable substrate into the dispenser line. The printed dissolvable substrate may be subdivided using perforated substrates where each section may correspond to a dosage.

The printed flavor may be used as an alternative to another flavor that is already associated with the one or more formulations. In some cases, these flavors may be combined to increase the amount of dosages of cannabidiol, terpene, etc. in the dispensing line. Here, the chemical printer 106 may receive the chemical signature from the chemical signature engine server 132. Based upon the chemical signature, the chemical printer 106 may print at least a single layer in a continuous pattern over a printable area of the dissolvable substrate to produce the printed dissolvable substrate. The single layer may include a particular dosage, amount, or chemical characteristics that comply with the received chemical signature.

The beverage dispenser 109*c* may include one or more processors and other hardware, as well as software components including those executable by the processor(s), to combine the beverage (e.g., associated with the base flavor) with the formulation(s) associated with additional flavors or the printed dissolvable substrate to generate the target flavor. In at least one embodiment, the beverage dispenser 109*c* may include embedded sensors to recognize a label, stamp, engraving, or the like bearing an identifier for the keg to detect type and other data of the first flavor 160. For example, each keg may include a label that can be used to identify gin, rum, tequila, etc. components of the base flavor that can be supplied via the dispensing line of the beverage dispenser. The label that is associated with the key may be stored in the beverage dispenser or the server 108. The beverage dispenser 109*c* may also include a user interface to show different selections flavors. The beverage dispenser 109*c* may send information of these flavors to the user device 104, which may then send the query to the server 108.

Embodiments described above connect a user's request for rendering a chemical signature to a chemical printer to carry out the request. In other embodiments, the user 102 may send a request to the server 108 to identify a chemical printer service suited to render the chemical signature. In such embodiments, the request may comprise an identifier for the user, a type of substrate, and a chemical signature that may comprise identifiers for one or more chemicals, or predefined sets of chemicals, to be printed on the substrate and amounts of the chemicals. The server 108 may additionally receive geolocation information about the requesting user, in or accompanying the request, or by another way such as from a user profile maintained or accessible by the server 108, or by the IP address or GPS coordinates from which the request was sent.

In some embodiments, the data store and/or database 112 may further hold referral information regarding chemical printer establishments that may be consulted to determine one or more sources to provide the printed substrate. The referral information may include, without limitation, one or more of the location, capacity, rating, capability of producing the substrate, turnaround time, and/or the like for each establishment. The user 102 may request this referral information, or the server 108 may make the request on behalf of the user 102, from the chemical signature database engine 110. The request for the referral information may be a general request, with the server 108 or chemical signature database engine 110 making an independent determination of suitable chemical printer establishments based on information contained in the user's request for the chemical printer service (e.g., without or with minimal added input from the user). Alternatively, the request for the referral information may specify factors for the server 108 and/or chemical signature database engine 110 to filter the results to only those chemical printer establishments that meet the parameters of the user request. In response to the request, the server 108 and/or chemical signature database engine 110 may return at least some of the retrieved referral information of the chemical printer establishments to the user and/or server 108 as the case may be.

By way of example, and without limitation, the chemical printer establishment may operate or control at least one chemical printer 106. Each chemical printer 106 may have a chemical printer profile that comprises a set of chemicals that the chemical printer 106 is configured to print. In some embodiments, the chemical printer profile has the information that is used to determine whether that chemical printer establishment can meet the referral information and thereby fulfil the chemical printing request. That is, the server 108, chemical signature database engine 110, and/or chemical printer establishment may receive (or already possess) and compare the referral information with the chemical printer profile, and determine whether a suitable match between the request and the chemical printer establishment can be made. Those chemical printer establishments that have one or more chemical printers 106 to meet the request may be included in the response to the user request and/or the request from the server 108, delivered to the user 102 or server 108. The response may include an identifier and/or contact information for the suitable chemical printer establishment(s), such as a web address, telephone number, physical location, and/or the like. In the case of a web address, the link may trigger a routine in the server 108 to automatically forward a request to print to the associated chemical printer establishment when clicked. Alternatively, the link could trigger a routine on the user device 104 to forward the request directly to the chemical printer establishment.

Usage history of the requesting user 102 may provide data that can be used by the server 108 for various purposes, including enhancing the user's experience in its dealings with the server/broker and/or chemical printer establishments. For example, the server 108 may collect indicia of use by the user 102 with respect to services associated with the ordering and purchase of printed substrates. That indicia of use may then form data inputs to analyze for patterns of use, which can be tied to promotions, frequent-user discounts, complaint history, and/or the like. Similarly, indicia of use of the chemical printer establishments can be collected for all users 102 to make similar data analysis of service by the chemical printer establishments, including timeliness, product quality, usage patterns, and/or the like. The server 108 or other entity may utilize the results of analysis to generate reports which can be studied to enhance the user experience, manage the business relationship with the chemical printer establishments, etc. In some embodiments, the data may be fed to machine learning models for predicting and improving customer service by the server 108 and chemical printer establishments.

In some embodiments, providing the referral information may be contingent on a successful validation of the digital code, if present, as described elsewhere herein. The user identifier may be or need to be associated with a verifiable payment account that can be debited by the cost of providing the referral information before the information is provided, contingent on the presence of an associated account and funds available for debiting. Similarly, the inclusion of a chemical printer establishment in the retrieved referral information may be made contingent on receiving prior payment.

In some embodiments, the user 102 may send a request to identify a third-party provider of chemical signatures. The request may comprise an identifier for the user, a type of substrate, and a chemical signature that may comprise identifiers for one or more chemicals, or predefined sets of chemicals, to be printed on the substrate and amounts of the chemicals. In response to receiving the request, the server 108 may retrieve from storage a user profile, or user profile information from the user profile, using the user identifier as a key. The server 108 may additionally retrieve from a data store of third-party providers of chemical signatures, referral information about such third-party providers, based at least on the user profile information. For example, referral information may be retrieved about third-party providers of chemical signatures near the user 102, or providers of chemical signatures that the user 102 habitually orders or is profiled to recommend based on factors such as purchase history, products similar to recent purchases, products that other users of similar profile have ordered, etc. At least some of the retrieved referral information may be returned to fulfil the request. The response may include an identifier and/or contact information for the suitable chemical printer establishment(s), such as a web address, telephone number, physical location, and/or the like. In the case of a web address, the link may trigger a routine in the server 108 to automatically forward a request to print to a chemical printer 106 at or near the user's location. Alternatively, the link could trigger a routine on the user device 104 to forward the request directly to the chemical printer 106.

In some embodiments, providing the referral information may be contingent on a successful validation of the digital code, if present, and on receiving prior payment, as described elsewhere herein. Further, the chemical printer 106 fulfilling the request may provide a signal as to whether the printing was successful (e.g., a steady-on light or sound signal when successful, a repeating signal when unsuccessful). The server 108, on receiving the signal from the chemical printer 106, may debit the payment account for a payment for providing referral information, contingent on receipt of a signal of a successful print.

Figure 2:
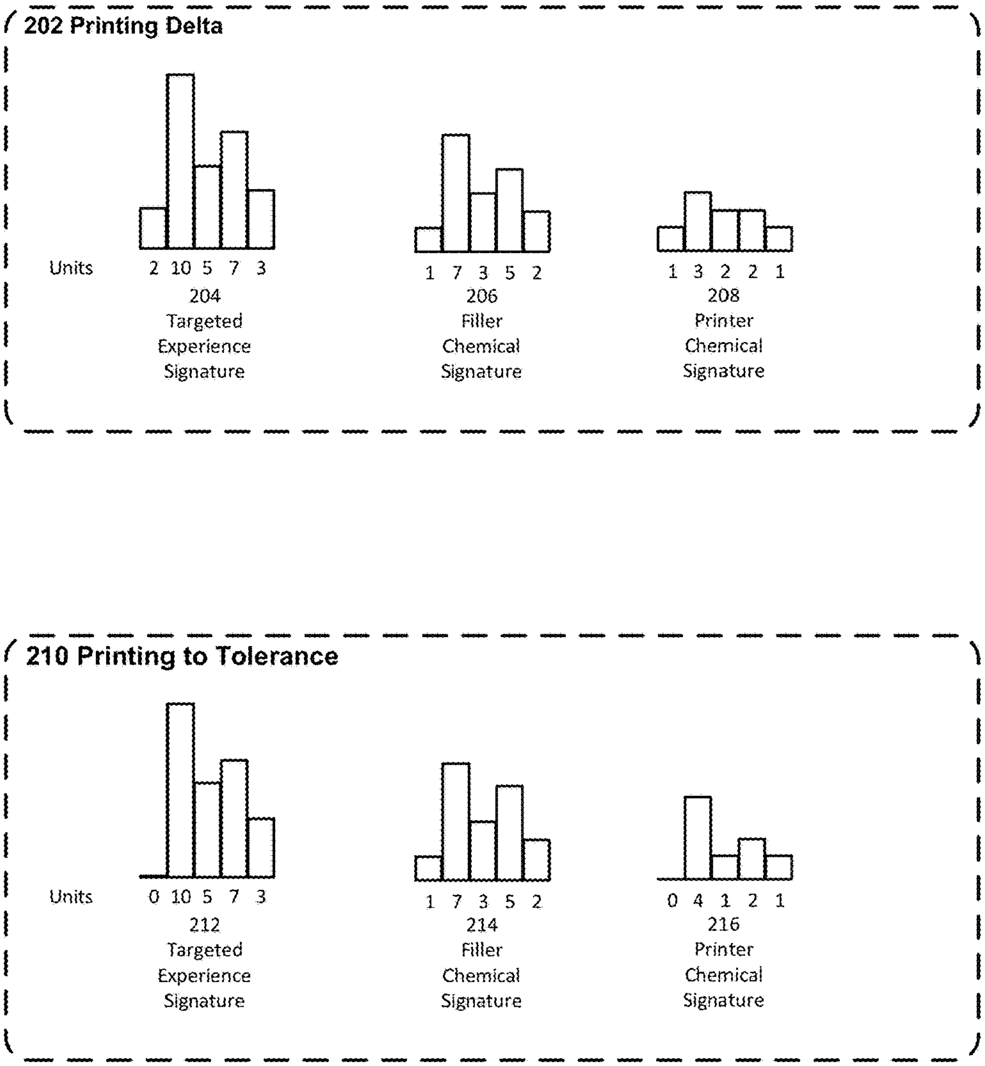
FIG. 2 is a diagram of various chemical signatures in the form of histograms.

Customization with respect to customizable printable solutions for delivery of inhalants or beverages may refer to the specifying of a targeted experience via a set of chemicals associated at least with quantities. FIG. 2 is a diagram 200 of exemplary chemical signatures and operations on chemical signatures.

A chemical signature may be comprised of a set of chemical identifiers and associated data. An example of a set of chemical identifiers may include:

CBD (representing cannabidiol)

LMN (representing limonene (a terpene)

MRC (representing myrcene (another terpene)

MTH (representing menthol (a flavoring)

DPG (representing dipropylene (a fixative agent))

The set of chemical identifiers may be used to create a histogram which represents an amount of the chemical identified by the identifier to be printed by the chemical printer 106. In many cases, the chemical printer 106 is programmed to print out a constant amount of the chemicals identified in the chemical signature. In this case, the chemical printer 106 may, for example, take the amount of the chemical identified by the chemical signature, divide it by the amount of time anticipated for the chemical printer 106 to print out a line along the length of a substrate, and print the chemical according to that ratio.

However, in some cases, the chemical signature may be comprised of a time series of histograms, each histogram indicating the amount of the chemical in the chemical signature to print at a particular point in time. Software on the chemical printer 106 (or external software), may calculate ratios, and print the chemical by the calculated ratio. For example, if a chemical signature indicates that it is anticipated that the product is to be consumed over 7 minutes, and that 5 units of cannabidiol (CBD) will be provided in the first half of consumption and 2 units of CBD in the second half of consumption, the chemical printer 106 will print 5 units over the first half of a printed line, and 2 units over the second half, where the length of the line is expected to burn for 7 minutes. In this way, the delivery of a particular chemical in a chemical signature can be customized over the time of consumption of the product.

FIG. 2 is a diagram 200 of various chemical signatures in the form of histograms 204, 206, and 208. Block 202 illustrates operations to specify signatures according to a delta. For example, consider a scenario in which a histogram 204 describes a targeted experience signature that would be usually delivered via an expensive form of *Cannabis*, and the user 102 wishes to reproduce the targeted experience with a less expensive composition of *Cannabis* to be used as a filler or *Cannabis* flavor. A goal would then be to determine the delta between the filler or flavor and the composition of the *Cannabis* for the targeted experience, and print the same.

In the example shown in FIG. 2, the histogram 204 specifies a set of five chemicals and their associated quantities (represented by bars from left to right corresponding to a “first chemical,” a “second chemical,” etc., respectively), and represents a chemical signature that may be suited for the targeted experience. The height of each bar indicates the amount of the corresponding chemical in the targeted experience signature, in arbitrary units represented by the number beneath the bar (i.e., two units of the first chemical are present, ten units of the second chemical are present, etc.). For example, the histogram 206 may represent a chemical signature for the substitute filler, and specifies the same set of chemicals in the targeted experience signature, but with the respective associated quantities indicating the quantities in the filler to be used by the user 102. Here, note that the histogram 206 shows shorter bars for the chemicals compared with those of the histogram 204. This indicates higher concentrations of the chemicals in the targeted experience signature.

To determine the chemical signature to be printed by chemical printer 106, we can take the difference between the two histograms 204 and 206. For example, the delta of the first chemical is the difference between 2 units of that chemical in the “targeted” histogram 204 and 1 unit in the “filler” histogram 206, yielding a corresponding 1 unit (i.e., 2 units−1 unit=1 unit) to be printed as indicated in the “printer” histogram 208, which represents the chemical signature of the difference between the targeted experience signature and the filler chemical signature (i.e., specifying the difference in the same set of chemicals between the two signatures). A corresponding example can be made for a liquid in a vaping apparatus or beverage. In the printer histogram 208, we can see that we have taken the differences between the targeted histogram 204 and the filler histogram 206 for all chemicals identified in those histograms in this example embodiment. Accordingly, the chemical printer 106 need only print the additional chemicals as represented by the printer chemical signature 208 to recreate or at least approximate the targeted experience.

While block 202 shows only operations with respect to filler, the same analogous operations may be performed for other ingredients such as fixative agents, preservatives, and the flammable substrate itself, or components that add a *Cannabis* flavor to vaping liquid or a beverage. The printer histogram 208 may also be hand modified and/or customized by the user 102 as desired.

In some examples, while some portion of the targeted experience may be recreated, a portion of a targeted experience might not. For example, certain sensory, pharmaceutical, or physical effects might not be reproduced. In some cases, this may be because not all the chemicals comprising the experience are accounted for. In other cases, the amount of chemical added via the printer is not precise.

In such cases, the user 102 may adopt a strategy of reproducing a targeted experience according to a predetermined tolerance. Specifically, the user 102 may accept a printer histogram that is the difference between the targeted experience histogram and the filler or liquid histogram plus or minus some quantity of units, i.e., a predetermined tolerance.

Block 210 illustrates an example of printing to a tolerance. By way of example, a user 102 may accept a predetermined tolerance of plus or minus 1 unit in the number of units for a first chemical, and the targeted histogram 212 shows zero units of that chemical. In this example, the presence of the first chemical may be considered an impurity. However, if the filler histogram 214 shows that 1 unit of that first chemical is present, the first chemical as a lesser quality substance may be acceptable, even as an impurity, because it is within the predetermined tolerance of plus or minus 1 unit.

Accordingly, we can take a difference between the targeted histogram 212 and the filler histogram 214, and generate a printer histogram 216 that, while not precise, is nevertheless within the predetermined tolerance. In such examples, it may be that the first chemical in the printer histogram should be −1 (e.g., 0 desirable units in the targeted experience signature but 1 unit in the filler chemical signature), but one cannot print a negative quantity. Accordingly, 0 units is accepted for the printer chemical signature instead since 1 unit from the filler histogram 214 and 0 from the printer histogram 216 yields 1 unit, which is still within the predetermined tolerance of the targeted histogram amount of 0 units.

Tolerances can support overshooting. For example, for the second chemical in the FIG. 2 example of printing to tolerance, the filler histogram indicates 7 units, and the printer histogram indicates 4 units yielding a total of 11 units. However, the targeted histogram indicates 10 units. Again, since this is within the predetermined tolerance of plus or minus 1, this amount of the second chemical in the printer chemical signature is acceptable.

Tolerances similarly support undershooting. For the third chemical, the filler histogram indicates 3 units, and the printer histogram indicates 1 unit, yielding a total of 4 units. However, the targeted histogram indicates 5 units. Yet again, since this is within the predetermined tolerance of plus or minus 1, this amount of the third chemical in the printer chemical signature is acceptable.

This notion of predetermined tolerances can be applied to a time series of histograms as well, thereby enabling the calculation of histograms for printing over the time of consumption of a product.

Figure 3:
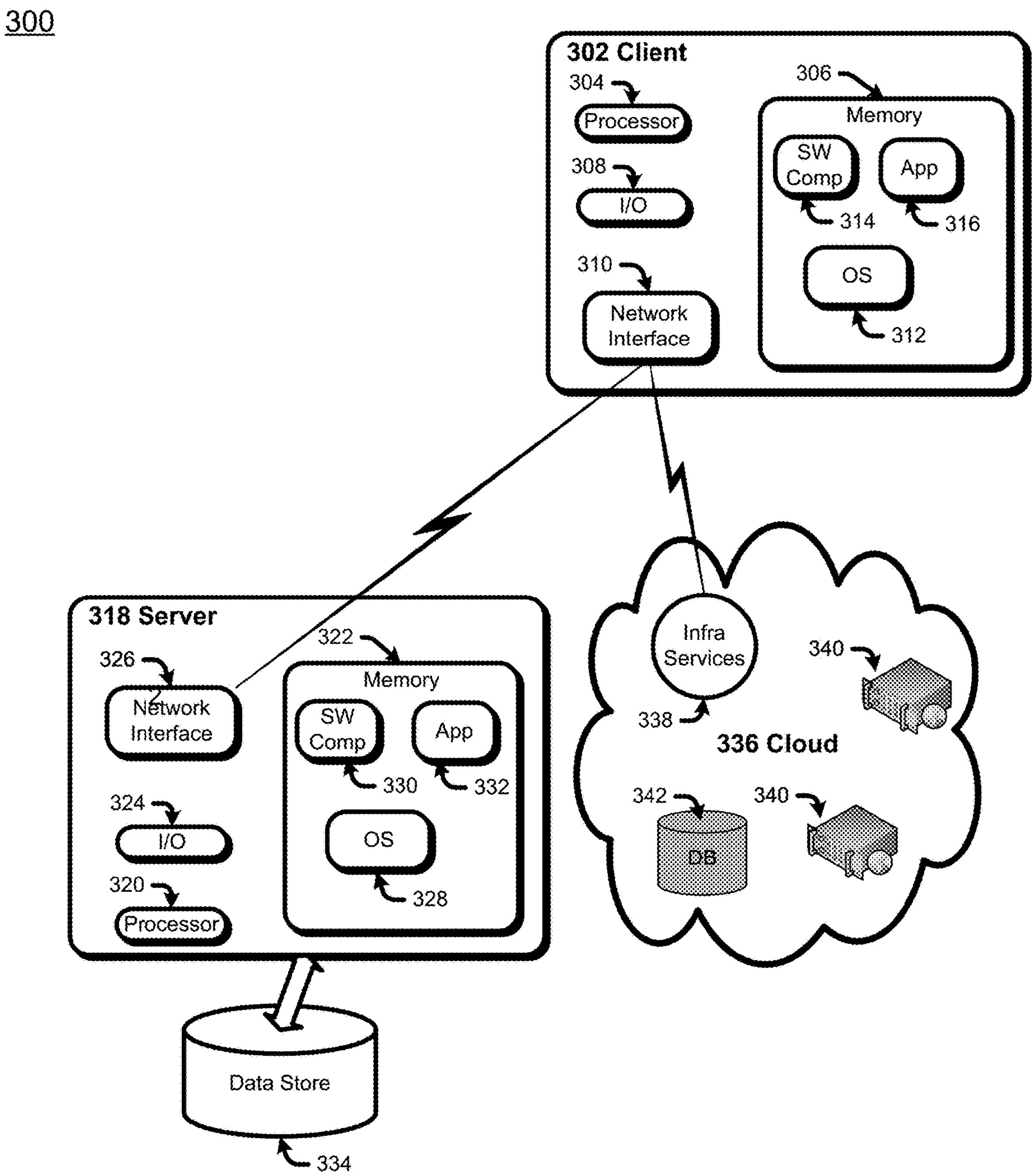
FIG. 3 is a hardware, software, and communications diagram for an exemplary environment for customizable printable solutions.

FIG. 3 is a hardware, software, and communications diagram for an exemplary environment for customizable printable solutions.

The functionality for customizable printable solutions may be generally hosted on computing devices. Exemplary computing devices include without limitation on the client-side: mobile devices (including smart phones), tablet computers, laptops, desktop personal computers and kiosks. Exemplary computing devices on the server-side include without limitation: mainframes, physical servers, and virtual machines. Generally, the computing devices may be networked.

A client-side computing device, or "client," 302 may correspond to the user device 104 and have a computer processor 304 and a computer readable memory 306. The processor may be a central processing unit, a repurposed graphical processing unit, and/or a dedicated controller such as a microcontroller. The computing device may further include an input/output (I/O) interface 308, and/or a network interface 310. The I/O interface 308 may be any controller card, such as a universal asynchronous receiver/transmitter (UART) used in conjunction with a standard I/O interface protocol such as RS-232 and/or Universal Serial Bus (USB). The network interface 310, may potentially work in concert with the I/O interface 308 and may be a network interface card supporting Ethernet and/or Wi-Fi and/or any number of other physical and/or datalink protocols. Alternatively, the network interface 310 may be an interface to a cellular radio.

Memory 306 is any computer-readable media which may store several software components including an operating system 312 and software components 314 and/or other software applications 316 including an internet browser or application integrating internet browsing capability. In general, a software component is a set of computer executable instructions stored together, e.g., on one or more non-transitory computer-readable media, as a discrete whole. Operating systems 312 and applications 316 are themselves software components or integrated aggregations of software components. Examples of software components 314 include binary executables such as static libraries, dynamically linked libraries, and executable programs. Other examples of software components 314 include interpreted executables that are executed on a run time such as servlets, applets, p-Code binaries, and Java binaries. Software components 314 may run in kernel mode and/or user mode.

Computer-readable media may include, at least, two types of computer-readable media, namely computer storage media and communications media. Computer storage media includes both volatile and non-volatile, both removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The server-side computing device, or "server," 318 may correspond to the server 108 and be any computing device that may participate in a network. The network may be, without limitation, a local area network ("LAN"), a virtual private network ("VPN"), a cellular network, or the Internet. The server 318 may have hardware components analogous to the client-side computing device 302. Specifically, it will include a computer processor 320, a computer memory 322, an input/output interface 324 and/or a network interface 326. In the memory 322 may be an operating system 328, software components 330, and/or software applications 332. Server 318 hardware may differ from client hardware 302 in that processing power is generally more powerful to handle concurrent processes running and network capacity is greater to communicate with multiple clients 302. Server-side software components 330 may include libraries and run-times (e.g., to run interpreted code). Server-side applications 332 may include web servers (also called "application servers") and database servers. Database servers hosted as a server-side application 332 may access external database storage 334 in the form of a separate hard drive, or potentially an array of hard drives. In some situations, the array of hard drives may be configured as a redundant array of independent disks (RAID), a set of potential configurations to prevent data loss in the event of a single disk failure.

In general, customizable printable solutions may be implemented as a software service on a physical server as the server 318. However, such a software service may also be hosted on the cloud 336 via a cloud service 338. Specifically, a cloud service 338 is comprised of multiple physical computer servers which are disaggregated via a hypervisor.

The cloud service 338 itself may embody an abstraction of services. Common examples include service abstractions such as Platform as a Service ("PAAS"), Infrastructure as a Service ("IAAS"), and Software as a Service ("SAAS").

Where the physical computer servers each may have one or more processors, memory, at least an I/O interface and/or network interface, the features and variations of the processors, memory, the I/O interface, and the network interface for virtual machines are substantially similar to those described for the physical computer server 318 described above.

A cloud service 338 includes a hypervisor which can delegate calls to any portion of hardware in the underlying physical servers, and upon request generates a virtual machine from the separate portions of hardware, regardless of physical server (a process called "disaggregation"). Just as a physical server 318, a virtual machine may host not only software applications, components including services, but also virtual web servers 340 functionality and virtual storage/database 342 functionality.

Note that virtual machines themselves may be further partitioned into containers, which enable execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on demand since the underlying virtual machine is already provisioned.

Figure 4:
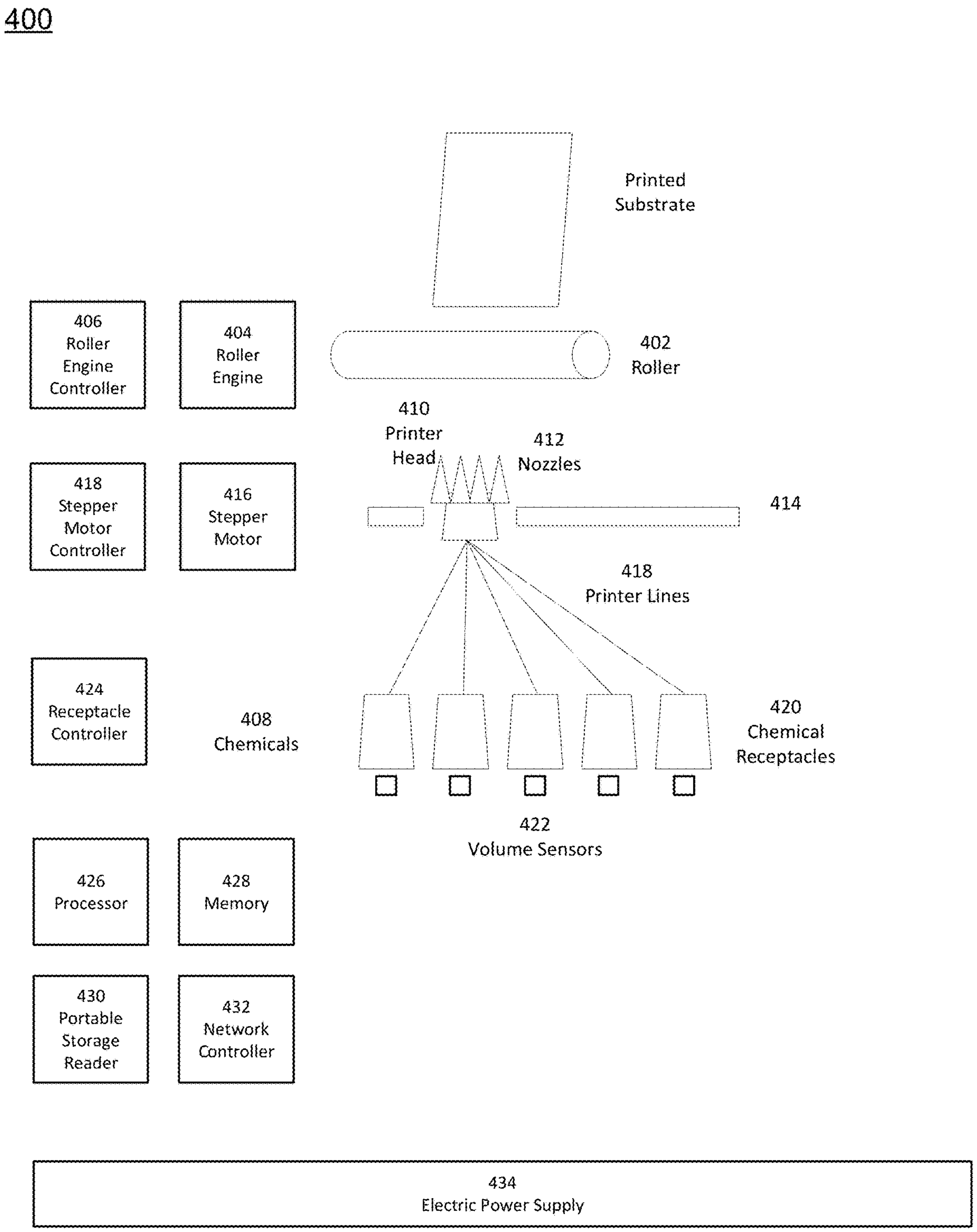
FIG. 4 is a block diagram of an exemplary chemical printer.

FIG. 4 is a block diagram 400 of an exemplary chemical printer 106. The chemical printer 106 may be an apparatus to infuse substrates 118 with chemicals. The chemical printer 106 may be configured to receive a printed substrate such as a sheet of cigarette rolling paper, for example and without limitation. In this example, the chemical printer 106 receives the substrate and controls the vertical position of the printer via a roller 402 which moves the substrate vertically, via a roller engine 404. The roller engine 404 may be controlled via a hardware controller chip (or equivalent component on a system on chip (SoC)) 406.

Chemicals 408 may be infused onto and/or into the printed substrate via a printer head 410 which has a plurality of nozzles 412. Nozzles 412 may correspond to the chemical to be printed. Printer head 410 may comprise piezo-electric printer heads or thermal (sometimes called bubble) printer heads.

Infusing the substrate horizontally may be achieved by moving the printer head 410 horizontally via a belt 414 attached to a stepper motor 416. The stepper motor is controlled via a hardware controller chip (or similar component, e.g., on an SoC) 418.

Chemicals may be sent to the printer head 410 via printer lines 418 connected to chemical receptacles 420, each of which contains a respective chemical of the set of chemicals 408, for example. In some embodiments, a receptacle 420 may be associated with a sensor 422 which may indicate the amount of chemical in the receptacle 420 or other attributes. The sensors 422 are communicatively coupled to the receptacle controller 424 which may provide software notifications based on information received from the sensors 422. In some embodiments, the receptacle controller 424 may be a hardware controller chip (or similar component, e.g., on an SoC).

Information and control commands from the roller engine controller 406, stepper motor controller 418, and receptacle controller 424 flow back and forth from the processor 426 via a bus (not shown), which may be external, or internal if on an SoC. Processor 426 may be in communicative control with a computer memory 428 configured to store computer executable instructions. The chemical printer 106 in general may be configured to be a computer client 302 as shown in FIG. 3. In some examples, the specific software stored in the computer memory 428 of the chemical printer 106 may include controller software, modification software, and/or chemical signatures for printing. The printer software is described in further detail with respect to FIG. 5 below.

Software and chemical signatures may be received by the chemical printer 106 externally. Two options include a portable storage reader 430 and a network controller 432. Specifically, the portable storage reader 430 may interface with the chemical printer 106 via an I/O interface as set forth in client interface 308 in FIG. 3. Other interfaces such as USB and serial interfaces may be used as well. The network controller 432 may correspond to client network controller 310 in FIG. 3.

Via the portable storage reader 430, software and chemical signatures 416 may be uploaded to chemical printer 106 via USB drivers, SD cards, and other similar media. The network controller 432 enables the reception of software and chemical signatures 416 to the chemical printer 106. Local software on the printer may enable the reception and storing into memory 428. The functions of the chemical printer may be powered by electric power supply 434.

The foregoing description of chemical printer 106 is not intended to be exhaustive or limiting. Rather, the description is intended to illustrate the customized printing of chemicals for delivery of inhalants. Features such as chassis, power management, and paper feed management may be incorporated into the chemical printer 106, as would be understood by one of ordinary skill in the art.

Figure 5:
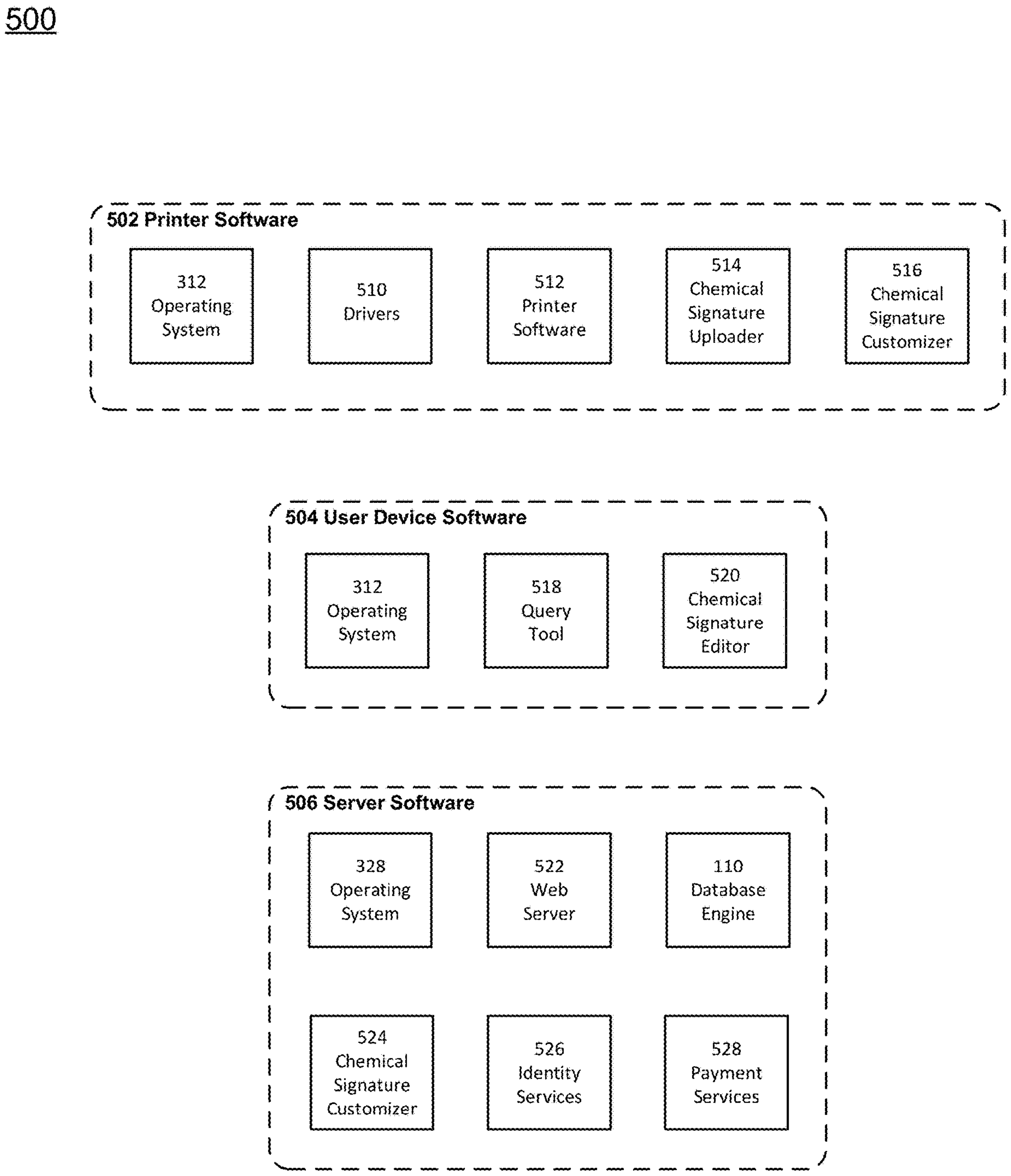
FIG. 5 is a block diagram of example client and server software printer components and/or applications for customizable printable solutions.

FIG. 5 is a block diagram 500 of example client and server software printer components 502 and/or applications for customizable printable solutions. As such, the example client and server components and/or applications may comprise the operational software of chemical printer 106, software user computer components 504 comprising the operational software of user computer 504, and server components 506 comprising the operational software of the server side functionality for customizable printable solutions for delivery of inhalants.

Printer software components 502 may be resident in printer memory 428 and comprised of computer executable instructions and computer readable data. For example, the printer software components 502 may be comprised of an operating system 312 and printer controller drivers 502. Recall that the printer has several controllers, including the roller engine controller 406, stepper motor controller 418, and receptacle controller 424. Printer software components 502 may include drivers that provide the software interface between the operating system 312 of the chemical printer 106 and the controllers 406, 418, 424. Printer software 512 may provide a user interface to provide notifications to the user about the status of the chemical printer 106 and to enable the user to configure the chemical printer 106.

Applications chemical signature uploader 514 and chemical signature customizer 516 may relate to the operation of the chemical printer 106 to receive chemical signatures as well as modify chemical signatures according to user specifications. In the case of the chemical signature uploader 514, a user may use USB, the portable storage reader 430, or the network interface 432 to upload chemical signatures for printing. In some embodiments, the chemical signature uploader 514 may handle the different I/O and network signals and protocols to receive software notifications that a signature is being uploaded, buffer the received signature, and store the received signature in a location in memory 428 where the signature may be located.

Once the signature is stored, the chemical signature customizer 516 may modify the chemical signature. For example, a user may use the chemical signature customizer 516 to store default settings for chemical signatures of the filler, printed substrate, fixative agents, preservatives, and the like. The chemical signature customizer 516 may then modify received signatures to satisfy default setting for the chemical signatures. The chemical signature customizer 516 may also received custom modifications as specified by the user via the chemical signature customizer 516 user interface for any purpose whatsoever. The chemical signature customizer 516 may then accordingly adjust the received signatures to take those custom settings into account.

Turning to the user device software components 504, the user device 104 also has a memory 306. Resident in memory 306 is an operating system 312 that enables the operation of applications. Query tool 518 is a tool to query the database engine 110 for chemical signatures. The query tool 518 may be a local application or may be a web application operating within a web browser on the user device 104.

Once the user 102 has retrieved one or more chemical signatures via the query tool 518, the user may edit the chemical signatures via the chemical signature editor 520. Here the chemical signature editor operates similarly to the chemical signature customizer 516 on the chemical printer 106, except that the editing may be done interactively by the user 102 on the user device 104. The operation of client side software is described in more detail with respect to FIG. 7.

The server software 506 may be resident in a server memory 322 or in a virtual machine in the cloud 336, for example. The server software 506 may include an operating system 328. Typical server software includes a web server 522 and a database engine such as the chemical signature database engine 110 which may host database applications. For web application embodiments, web server 522 may host applications that support a web interface for the query tool 518. Typical web servers include Apache and Tomcat. Web applications may then interact with a database server (such as the chemical signature database engine 110) which may be in the form of a relational database management system (RDBMS) such as Microsoft SQL Server™ and Oracle Database™.

Upon receiving a query, the chemical signature database engine 110 (or web application server 522 for some web application embodiments) may query a data store of signatures such as the chemical signature database 112. Optionally the chemical signature customizer 524 may modify chemical signatures before returning.

In some cases, the chemical signature database engine 110 (or web applications server 522 for some web application embodiments) may have need of authentication services. An identity services server 526 which stores user accounts and credentials may provide such authentication services. If downloaded chemical signatures are to be paid for, payment services 528 provide an interface to debit accounts. The operation of server side software is described in more detail with respect to FIG. 7.

Figure 6:
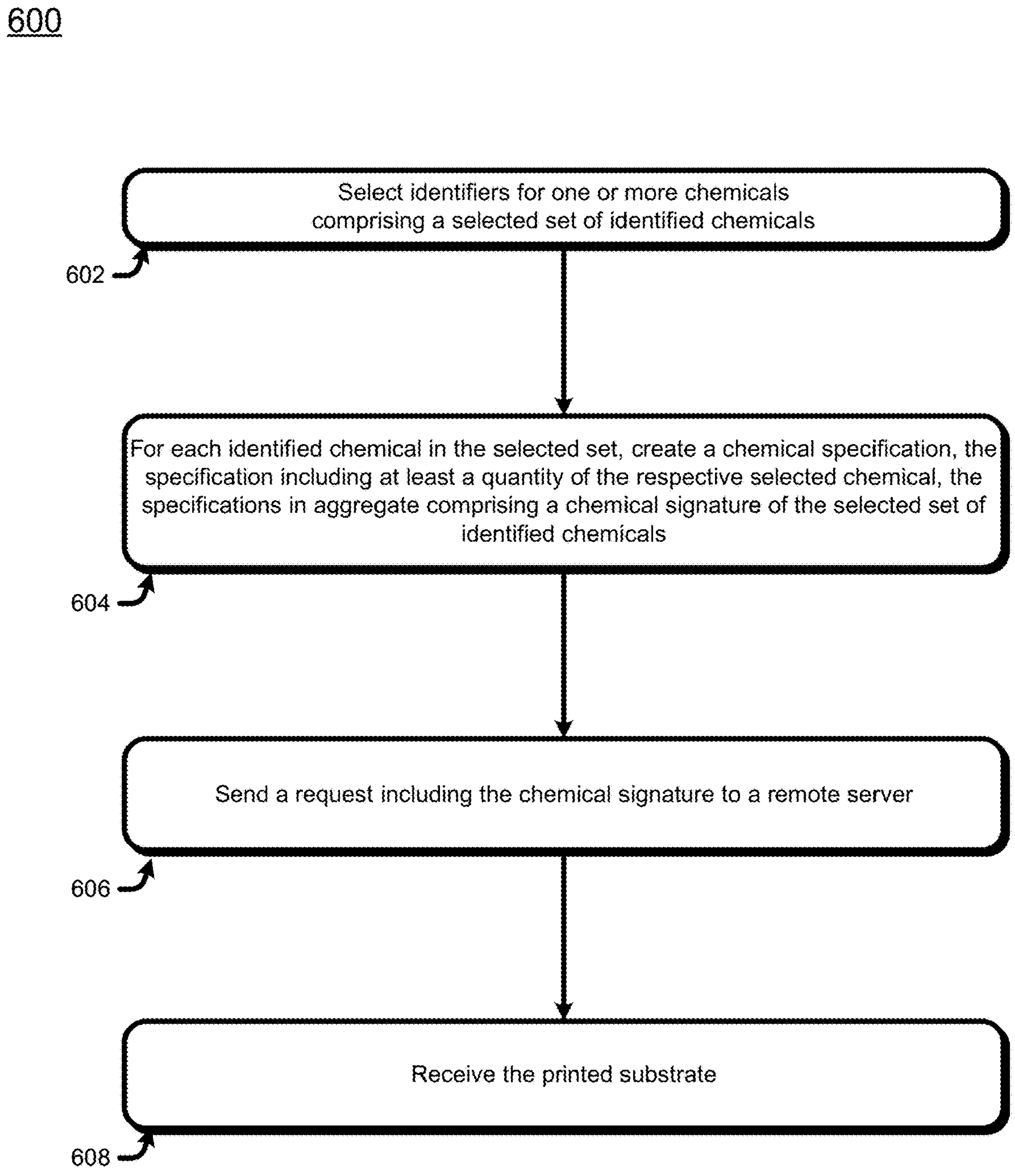
FIG. 6 is a flow chart for exemplary printer operations for remote printing for customized chemical mixing.
Figure 7:
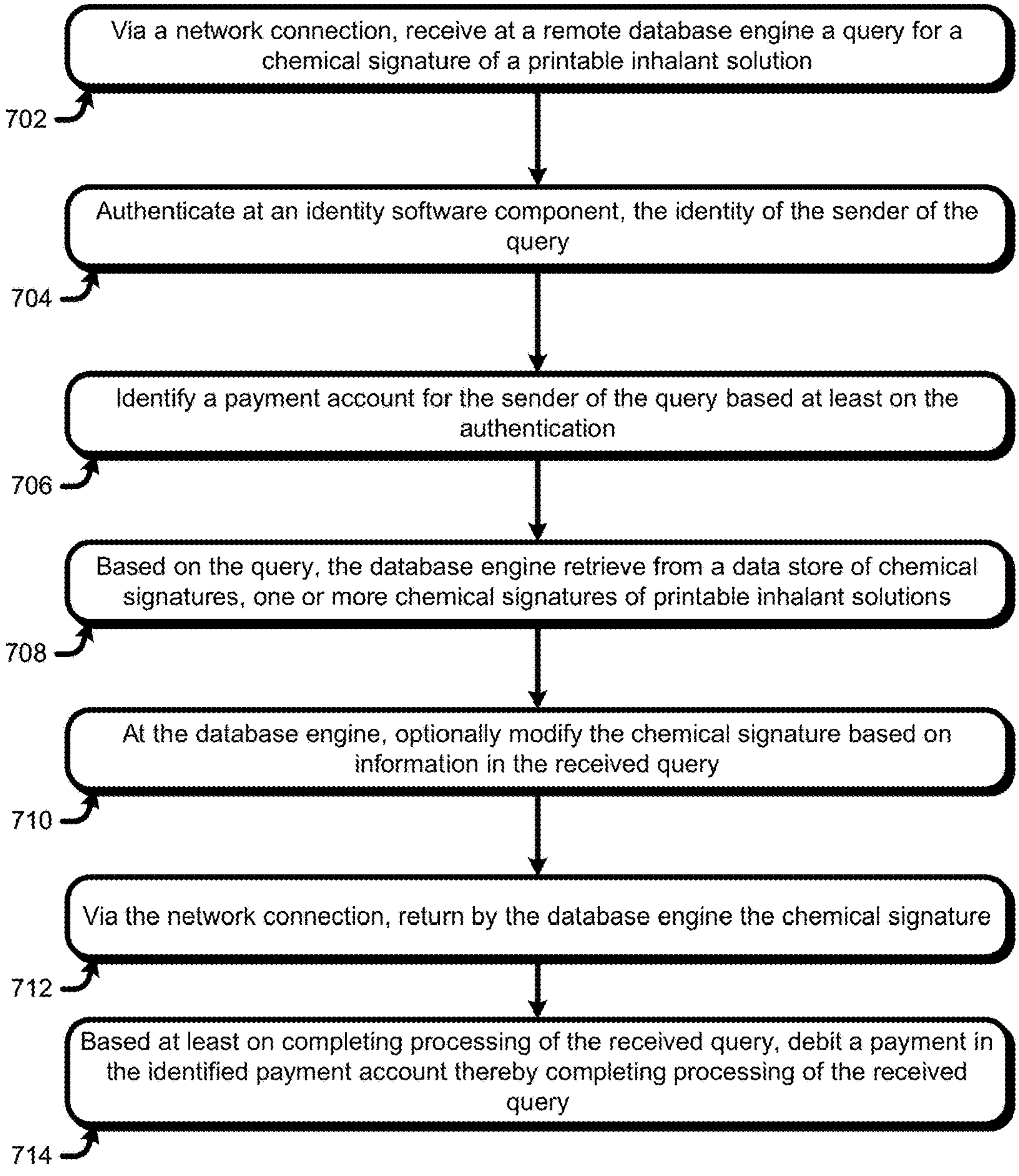
FIG. 7 is a flow chart for exemplary server software operations for remote printing for customized chemical mixing.

FIGS. 6-7 present illustrative processes 600 and 700, respectively, for implementing customizable printable solutions for the purposes described herein and others as appropriate. Each of the processes 600 and 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600 and 700 are described with reference to the architecture 100 of FIG. 1.

FIG. 6 is a flow chart 600 for exemplary printer operations for remote printing for customized chemical mixing. More specifically, flow chart 600 describes example operations to request a customized solution for printing and mechanically printing the solution.

In block 602, a user 102 may select software identifiers for one or more chemicals comprising a selected set of identified chemicals. The selected set of identified chemicals may be represented in a histogram as described elsewhere herein. The chemicals may correspond to chemicals to be printed by the chemical printer 106 and/or to chemicals contained in filler, substrate, fixative agents, liquids, and/or preservatives. In this way, the chemicals to comprise the chemical signatures to be processed and retrieved are set.

In block 604, the user 102 may, for each identified chemical in the selected set, create a chemical specification, the specification including at least a quantity of the respective selected chemical, and the specifications in aggregate comprising the chemical signature of the selected set of identified chemicals in some embodiments. The chemical specification may be preset such that the user's "creation" may in practice be a designation of the chemical specification without specifying its components. In any event, the quantity of units may be based on a targeted experience. Accordingly, the user may specify the quantity of units by retrieving chemical signatures from the database engine 110 via the query tool 518 in some embodiments. Alternatively, or in addition, the user 102 may upload chemical signatures via USB, portable storage via portable storage reader 430, or from the network via network controller 432.

Note that chemical signatures from third parties or database 430 may have different or additional chemicals in their signatures. Having user 102 specify the chemicals or chemical signatures available to work with via selecting or designating chemicals to comprise the chemical signature in block 602 enables the definition of a common set of histograms, and therefore enables operations between those chemical signatures.

In block 606, the user 102 may send a request to the server 108 to obtain the chemical printing corresponding to the requested chemical signature. In some instances, in accordance with the request, the user 102 may select a solvent and a solvent quantity based at least on one chemical specification in the chemical signature, the solvent suitable for dissolving the specified chemicals in the chemical signature and for printing onto a predetermined flammable base substrate. For example, the user 102 may select a solvent suitable for dissolving the chemicals to be printed i.e., the chemicals specified in block 602. The chemicals in the chemical signature may be dissolved into the selected solvent in accordance with or in response to the selection, either individually or in combination. The solvent may be oil or water, but in some cases may be combined with a fixative agent such as dipropylene. In this way, when the chemicals are printed onto a substrate, for example, the chemicals may not evaporate quickly and thereby negatively impact the printing process. The selected solvent may also be sent with the request.

In block 608, the user 102 may receive the substrate printed in accordance with the parameters of the request.

FIG. 7 is a flow chart 700 for exemplary server software operations for remote printing for customized chemical mixing. More specifically, flow chart 700 describes example software steps on the server side when querying and modifying chemical signatures for targeted experiences.

In block 702, via a network connect, a chemical signature database engine 110 (or web application which forwards a received query) may receive a query for a chemical signature of a printable solution. The network connection may be via the Internet or may be a local network connection, for example. In some embodiments, the query will be from query tool 518.

The query tool 518 may allow for a wide range of queries. Some options include querying by brand name, querying by concentration by amount of chemicals, and querying by similarity to a chemical signature. Regarding the last two options, since chemical signatures correspond to histograms, query results may be ranked via use of histogram similarity measures.

Note, also, that the database engine 110 may store user generated content such as identity of uploader, rankings, and reviews. Accordingly, the query tool 518 may query according to those values as well.

Prior to processing a query, in block 704, a web application or server side application may authenticate, at an identity software component, the identity of the sender of the query by receiving credentials and forwarding them to identity services 526. Identity services 526 may delegate authentication to third party services such as Google™ and Facebook™ or alternatively authenticate against credentials directly managed by identity services 526. In this way, an account associated with the querying party, here user 102, may be retrieved. In block 706, this account may be used to identify a payment account for the sender of the query for performing payments based at least on the authentication.

Based on the query, if authentication succeeds, in block 708, the database engine 110 may respond to the received query and retrieve from a database 112 of chemical signatures, one or more chemical signatures.

In some embodiments, the database engine 110 may retrieve full signatures but only perform query matches using histogram distance measures against the subset of chemicals specified in the query. In other embodiments, the database engine 110 may include rules that determine whether chemicals not included in the query may cause undesirable qualitative effects when printed.

In some embodiments, a user 102 may have uploaded chemical signatures of filler, printed substrate, fixative agents, preservatives, liquids, and the like, or of customizations. In this case, in block 710, the database engine 110 (or web application for some web embodiments) via a chemical signature customizer 524 may modify a chemical signature before returning it for response, based on information in the received query. In this way, the user 102 need not edit returned results prior to printing.

In block 712, the chemical signatures retrieved by the database engine 110 (and optionally modified by chemical signature customizer 524) may return the search results including the chemical signature. In some cases, the user may specify receiving additional information about the retrieved chemical signature or signatures. These include user generated content, such as textual or media reviews of the chemical signature, comments, and ratings. Other additional information may include instructions on how to make use of the chemical signature.

If the retrieved results are to be paid for, in block 714, the database server 110 (or web application) may invoke payment services 528 and debit the payment account retrieved in block 706 accordingly. In some embodiments, the debiting may be in response to or based at least on completing processing of the received query. In this way, a wide range of monetization techniques and business models are enabled.

The foregoing disclosure describes embodiments in which a user 102 using a user device 104 obtains a chemical signature product, such as a chemically printed substrate, from a chemical printer 106 via a server 108. In other embodiments based on similar concepts, the user 102, via the user device 104, may send the request or query directly to the chemical printing service without going through an intermediate server. In such embodiments, the chemical printing service may access a database of chemical signatures to retrieve one or more that will fulfil the user's request. By way of example, the chemical printing service may access the chemical signature database 112 via query to the chemical signature database engine 110.

The following disclosure describes techniques for performing an on-demand customization of inhalants to improve a vaping experience. Particularly, the techniques may include showing a selection of target flavors via a user interface of a vaping apparatus, comparing chemical components of a user-selected target flavor with a base flavor, and receiving a chemical signature based at least in part upon a comparison between the target flavor and the base flavor. The chemical signature may be received by the vaping apparatus from a server. The base flavor may be associated with a wick that produces a flavor when heated. The produced flavor (or base flavor) may include, without limitation, tobacco, mint, mango, tropical fruit, cola, or other flavors, for example. The target flavor may include a combination of the base flavor and additional chemicals such as, without limitation, predetermined dosages of *Cannabis*, terpenes, or a suitable combination thereof. In one example, the vaping apparatus may utilize the chemical signature as a reference for injecting predetermined dosages of one or more pre-vapor formulations into a chamber of the vaping apparatus. The vaping apparatus may then apply heat to a combination of the base flavor and the pre-vapor formulations in the chamber to generate the targeted flavor. This technique of on-demand customization of inhalants may improve the vaping experience and reduce the cost of vaping by dynamically adjusting the amount of chemicals to be added to the base flavor depending on a target experience or flavor.

Without limitation, the chemical signature may include an information that identifies dosages, types, and/or other data associated with the chemicals to be used for generating a flavor change. The information may further identify a method, timing of injecting the pre-vapor formulations to the chamber, and/or threshold values such as an airflow pressure threshold that can be used as a reference to activate a heating element in the vaping apparatus. In one embodiment, the chemical signature is based upon a comparison between chemical components of the base flavor of the vaping apparatus and the selected target flavor. For example, the comparison may result in adding a particular dosage of cannabidiol or a terpene to a tobacco-base flavor during vaping. In this example, the additional particular dosage may be treated as a difference between the target flavor and the base flavor.

As described herein, *Cannabis* is a genus of flowering plants that include the species: *Cannabis sativa, Cannabis indica*, and *Cannabis ruderalis. Cannabis* has long been used for hemp fibers, seed and seed oils, medicinal purposes, and recreational purposes. Cannabidiol, better known as "CBD," is one of the chemical compounds called "cannabinoids" that are found in the *Cannabis sativa* plant. The *Cannabis sativa* plant may also include terpenes, which are common compounds in the natural world. Terpenes are responsible for the smell of many plants. The terpenes may act on the endocannabinoid system in the human body in a similar way to the cannabinoids.

Some embodiments described herein may include a vaping apparatus that may comprise an interface to receive a selected target flavor; a processor coupled to the interface, the processor configured to execute instructions to compare the selected target flavor with a base flavor and receive a chemical signature based at least in part upon a comparison between the target flavor and the base flavor; and a chamber module coupled to the processor. The chamber module may comprise at least one nozzle that uses the chemical signature as a reference for injecting one or more pre-vapor formulations into a chamber, and a vaporizing heater that heats the base flavor and the injected one or more pre-vapor formulations to generate the target flavor.

The vaping apparatus may comprise a wick that is positioned within a cartridge and dipped onto an oil to absorb the base flavor, wherein the base flavor includes a tobacco flavor. In some embodiments, the processor executes instructions to send a query to a server that includes data information of a comparison between chemical components of the target flavor and the base flavor. The processor receives the chemical signature in response to the query sent to the server. In some embodiments, a look-up table (LUT) may be provided that include corresponding chemical signatures for different target flavors.

In some embodiments, the vaping apparatus may comprise a printed substrate that provides a dosage of printed dissolvable substrate into the chamber, wherein the dosage of printed dissolvable substrate is combined with the base flavor to generate the target flavor. The printed dissolvable substrate may be used as an alternative to the pre-vapor formulations. The pre-vapor formulations include at least one of a Tetrahydrocannabinol (THC), a purified terpene, glycerin, ethanol, polyvinylpyrrolidone, or water. For example, the target flavor may include the base flavor and an additional dosage of THC.

In some embodiments, a method may comprise receiving, by a vaping apparatus, a selected target flavor; comparing the selected target flavor with a base flavor; receiving a chemical signature based at least in part upon a comparison between the target flavor and the base flavor; injecting one or more pre-vapor formulations into a chamber; and applying heat in the chamber that vaporizes the base flavor and the injected one or more pre-vapor formulations to generate the target flavor.

The method may also comprise dipping a wick that is positioned within a cartridge onto an oil to absorb the base flavor, wherein the base flavor includes a tobacco flavor. In some embodiments, the method may comprise sending a query to a server that includes data information of a comparison between chemical components of the target flavor and the base flavor. The chemical signature may be received is in response to the sending of the query to the server. The resulting difference between the chemical components of the target flavor and the base flavor corresponds to the injected one or more pre-vapor formulations in the chamber.

In some embodiments, the method may comprise inserting into the chamber a dosage of printed dissolvable substrate, wherein the dosage of the printed dissolvable substrate is combined with the base flavor to generate the target flavor. The pre-vapor formulations may include at least one of a Tetrahydrocannabinol (THC), a purified terpene, glycerin, ethanol, polyvinylpyrrolidone, or water, and the target flavor may include the base flavor and an additional dosage of THC.

In some embodiments, one or more non-transitory computer-readable storage media may store computer-executable instructions that upon execution cause one or more computers to collectively perform acts comprising receiving a selected target flavor; comparing the selected target flavor with a base flavor, wherein the base flavor includes a tobacco flavor; receiving a chemical signature based at least in part upon a comparison between the target flavor and the base flavor; injecting one or more pre-vapor formulations into a chamber; and applying heat in the chamber that vaporizes the base flavor and the injected one or more pre-vapor formulations to generate the target flavor.

The chemical signature may be received in response to a sending of a query to a server, and the pre-vapor formulations may include at least one of a Tetrahydrocannabinol (THC), a purified terpene, glycerin, ethanol, polyvinylpyrrolidone, or water.

Details regarding the novel products and techniques referenced above and presented herein are described in detail, below, with respect to several figures that identify elements and operations used in systems, devices, methods, and computer-readable storage media that implement the techniques.

Figure 8:
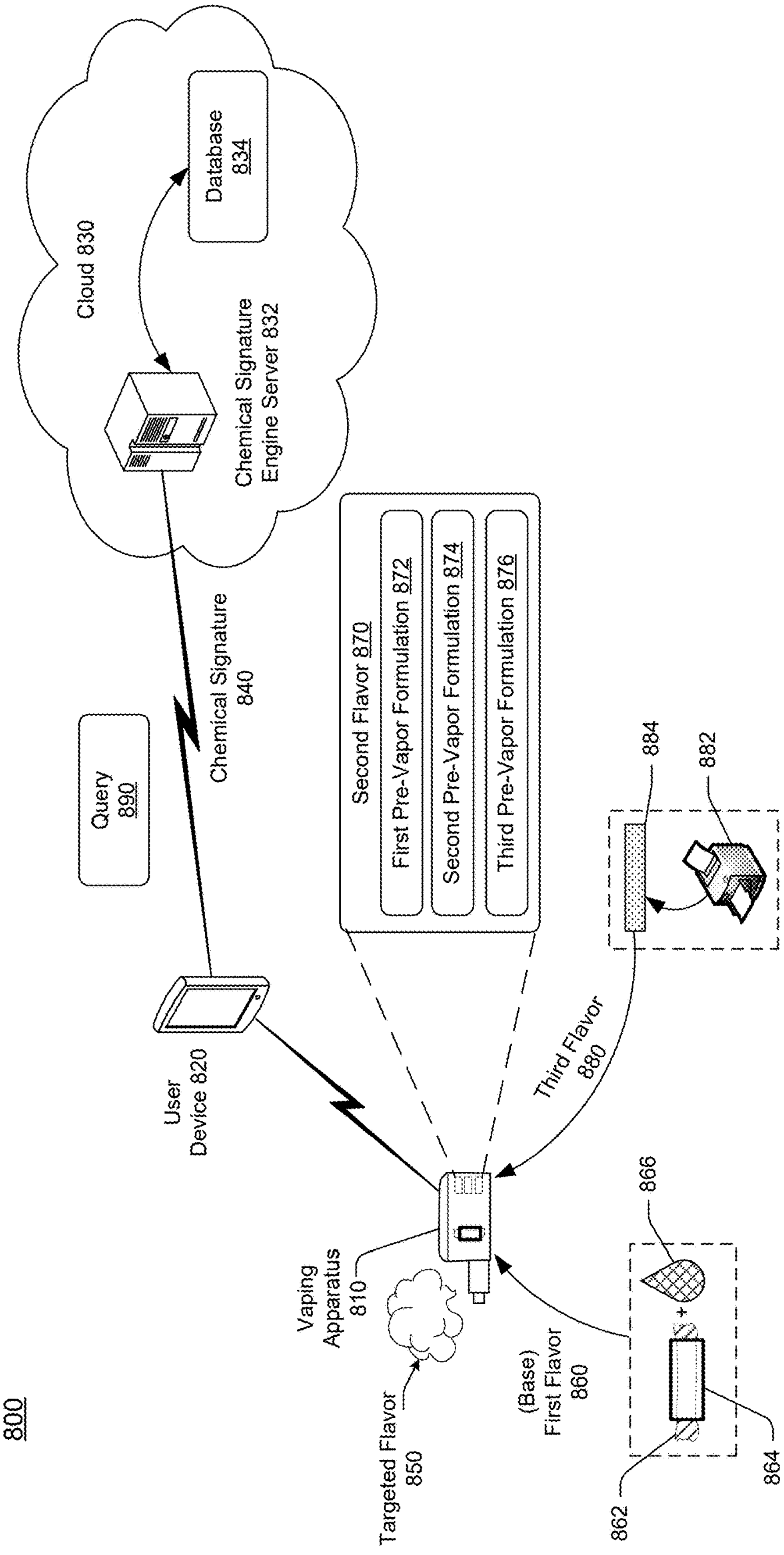
FIG. 8 is a context diagram for an example of implementing an on-demand customization of inhalants for vaping, in accordance with at least one embodiment.

FIG. 8 is a context diagram 800 that illustrates an example of an on-demand customization of inhalants for a vaping operation. As shown, a vaping apparatus 810 may be associated with a user device 820, which is communicatively connected to a cloud 830 to access a chemical signature engine server 832. The chemical signature engine server 832 may be connected to a database 834 that stores a plurality of chemical signatures. Each chemical signature in the stored chemical signatures may be comprised of a set of identifiers for various chemicals, corresponding quantities, and other data. The chemical signature engine server 832 may include one or more servers that can be configured to generate a chemical signature 840, which can be used by the vaping apparatus 810 as a reference to create a targeted flavor 850. The vaping apparatus may initially include a first flavor 860 as a base flavor where the base flavor can be combined with a second flavor 870 and/or a third flavor 880 to generate the targeted flavor 850. The second flavor 870, which may be generated via a combination of one or more injectable pre-vapor formulations, or the third flavor 880, which may be generated via a printed dissolvable substrate, may each contain certain dosages of *Cannabis*, terpenes, or a suitable combination thereof. The targeted flavor 150 may be dynamically varied or generated on demand based upon a target flavor, which can be selected via a user interface of the vaping apparatus. This technique of customizing on demand the target flavor may improve the user experience and can further generate a cheaper version of dynamically adding *Cannabis*, terpenes, etc. to the base flavor in some examples.

As shown, the first flavor 860 may be obtained via a wick 862 that can be positioned and/or inserted into a replaceable cartridge 864 to absorb an oil 866. The first flavor 860, which may be derived from a heated oil 866, may include tobacco, mint, mango, tropical fruit, cola, or other flavors, for example. The second flavor 870 may be obtained via a combination of one or more pre-vapor formulations such as a first pre-vapor formulation 872, a second pre-vapor formulation 874, a third pre-vapor formulation 876, or a suitable combination thereof. Each of these pre-vapor formulations may include a different type of chemical component and can be drawn from their corresponding reservoir within the vaping apparatus 810. One or more nozzles (not shown) are in fluid communication with the one or more pre-vapor formulations to inject these chemical components into the chamber of the vaping apparatus. The three pre-vapor formulations are for illustration purposes only and other pre-vapor formulations may form the second flavor 870 without affecting the embodiments described herein.

The third flavor 880 may be associated with a printed dissolvable substrate that can be inserted and/or vaporized in the chamber to mix/combine with the base flavor from the wick 862. For example, a printer 882 may print one or more layers of ink on a dissolvable substrate 884 to generate the printed dissolvable substrate that is vaporized to generate the third flavor 880. In one embodiment, the ink may include a composition that can be obtained via a combination of the formulations that are associated with the second flavor 870.

In one embodiment, the second flavor 870 and/or the third flavor 880 may be generated using the chemical signature 840 that can be received by the user device 820 in response to sending a query 890 requesting the chemical signature engine server 832 for the targeted flavor 850. In response to the request, the chemical signature engine server 832 may determine a difference between the first flavor 860 and the targeted flavor 850. Based on the determined difference, the second flavor 870 and/or the third flavor 880 may be combined with the first flavor 860 to obtain the targeted flavor 850.

Turning to the replaceable cartridge 864, the wick 862 may include suitable materials such as, without limitation, glass, ceramic, or graphite-based materials, which can be used to absorb oil and other chemicals from one or more reservoirs of the vaping apparatus 810. In one example, a vaporizing heater (not shown) may apply a particular amount of heat to the replaceable cartridge 864 to vaporize the oil 866 resulting in a generation of the first flavor 860. The first flavor 860 may include, without limitation, tobacco, mint, mango, tropical fruit, cola, or other flavors. The vaporizing heater may include a wire coil that transfers heat to incoming ambient air that can be drawn through chamber vent holes (not shown) during vaping, which in turn heats the wick, oil, injected pre-vapor formulations, and/or the printed dissolvable substrate by convection. The replaceable cartridge 864 may provide a consistent and reliable distribution of the oil 866 onto the vaporizing heater by limiting direct contact of the wick 862 to the vaporizing heater.

The targeted flavor 850 may include an enhanced vaping flavor that can be generated on demand via the user device or the vaping apparatus itself. The targeted flavor may include an enhancement of the base flavor via, without limitation, adding a certain dosage of tetrahydrocannabinol, cannabidiol, terpenes, or a suitable combination thereof. In one embodiment, the vaping apparatus 810 may be configured to present options for the target flavors to a user. For example, each target flavor may correspond to a preset radial position of a target flavor wheel (not shown) that can be rotated to select the target flavor from different target flavors offered by the vaping apparatus 810. Due to a vaping apparatus's small form factor, the target flavor wheel may include an indicator tab that stops at a predetermined number of preset radial positions where each preset radial position corresponds to a target flavor that can be presented via a user interface. In this example, the selected target flavor may include the combination of the base flavor that can be derived from the wick of a replaceable cartridge and the additional flavor(s) that can be obtained from the pre-vapor formulations or the printed dissolvable substrate.

In one embodiment, the target flavor 850 may include subtraction or removal of dosages of the second flavor 870 and/or the third flavor 880 from the chamber of the vaping apparatus. In this embodiment, the vaping apparatus may pause the injection of the pre-vapor formulations and/or insertion of the printed dissolvable substrate into the chamber.

The second flavor 870 may be generated to add, without limitation, a particular amount or dosage of tetrahydrocannabinol, cannabidiol, terpene(s), or a suitable combination thereof, to the base flavor. In some embodiments, the second flavor 870 may be generated from one or more pre-vapor formulations with relatively high viscosity and density formulation to transform into a vapor. Without limitation, each of the pre-vapor formulations may be a liquid, solid, or gel formulation including, but not limited to, one or more of water, solvent, glycerin, polyvinylpyrrolidone, ethanol, plant extract, and the like. In one embodiment, a pre-vapor formulation may include volatile cannabidiol flavor compounds that are released upon heating. The pre-vapor formulation may further include active ingredients such as tetrahydrocannabinol, terpenes, etc. Other ingredients or chemicals may include flavorings such as mint and menthol. Still, other chemicals may include fixative agents or preservatives.

The third flavor 880 may be generated by vaporizing the printed dissolvable substrate that can be inserted in increments, for example, into a chamber of the vaping apparatus 810. In one embodiment, the third flavor 880 may be used as an alternative to the second flavor 870 that is associated with the one or more pre-formulations. In another embodiment, the second flavor 870 and the third flavor 880 are combined to produce increased amounts of dosages in the chamber. Here, the printer 882 may receive the chemical signature 840 from the vaping apparatus 810, user device 820, or directly from the chemical signature engine server 832. The printer 882 may receive the chemical signature from the vaping apparatus when the vaping apparatus itself is performing the on-demand customization process such as sending of the query to the server, receiving the chemical signature from the server, and the like. Based upon the chemical signature 840, the printer 882 may print at least a single layer in a continuous pattern over a printable area of the dissolvable substrate 884 to produce the printed dissolvable substrate. The single layer may include a particular dosage, amount, or chemical characteristics that comply with the received chemical signature 840.

For example, the selected targeted flavor may require an additional compound that comprises 70% purified cannabinoid by weight for each dose that is combined with the wick flavor as the base flavor. Here, the chemical signature 840 may include specific quantities and types of the chemical compounds that can be mixed to generate the desired additional compound comprising of 70% purified cannabinoid by weight for each dose that is combined with the base flavor. In this example, and to prepare the ink for the printer 882 based on this specification, a purified cannabinoid from molecules such as tetrahydrocannabinol (THC) may be combined with a purified terpene, glycerin, ethanol, polyvinylpyrrolidone, and water to create a composition of ink comprised substantially of THC by weight. Without limitation, 70 mL of THC, 3.0 mL of purified terpene such as linalool, 7 mL of glycerin, 20 mL of ethanol, 100 mg of polyvinylpyrrolidone, and 15 mL of water may be mixed thoroughly to generate the ink composition that comprises 70% purified cannabinoid by weight and 3% terpene by weight. The ink composition is then printed onto the dissolvable substrate 884 to generate a printed dissolvable substrate, which can be vaporized in the chamber to generate the third flavor 880. The vaporized printed dissolvable substrate may generate the third flavor comprising 70% purified cannabinoid by weight for every 10 mg of TCH, for example.

Following the preceding example, the generated ink composition may be scaled and similarly implemented by one or more nozzles (not shown) that inject the pre-formulations that are associated with the second flavor 870. For example, the pre-vapor formulations in the second flavor 870 may include 0.7 mL of THC, 0.03 mL of purified terpene such as linalool, 0.07 mL of glycerin, 0.002 mL of ethanol, 1 mg of polyvinylpyrrolidone, and 0.015 mL of water. In this example, the corresponding nozzle for each pre-vapor formulation may be configured to inject the corresponding amounts into the vaping apparatus chamber to add the 70% purified cannabinoid by weight and 3% terpene by weight to each 10 mg dose of THC to be vaporized. This vaporized composition is then mixed with the first flavor 860 to generate the targeted flavor 850.

The vaping apparatus 810 may include hardware and software components to vaporize a combination of the first flavor 860 and either the second flavor 870 or the third flavor 880 to generate the targeted flavor 850. In one embodiment, the vaping apparatus 810 may include embedded sensors (not shown) to identify a label of the cartridge 864 to detect type and other data of the first flavor 860. For example, each cartridge may include a label that can be used to identify the components of the base flavor that are inserted into the chamber of the vaping apparatus. The label that is associated with the cartridge is stored in the vaping apparatus or the chemical signature engine server 832. The vaping apparatus 810 may also include a user interface (not shown) to show the different selections for the targeted flavors. Based upon a user-selected targeted flavor, the vaping apparatus 810 may send information of the first flavor and the selected target flavor to the user device 820. The user device 820 may then send the query 890 to the chemical signature engine server 832. In response to receiving the query 890 from the user device 820, the chemical signature engine server 832 retrieves the chemical signature 840 from the database 834 and sends the chemical signature 840 to the user device 820, and the user device 820 transmits the chemical signature 840 to the vaping apparatus 810 and/or the printer 882. The chemical signature 840 may define the composition of the second flavor 870 or the third flavor 880 to be combined with the first flavor 860. In some embodiments, the vaping apparatus 810 may include a processor that can execute instructions to determine the chemical signature based upon the first flavor 860 and the target flavor that can be selected via the vaping apparatus. For example, the processor may use a look-up table (LUT) to determine the chemical signature based upon the selected target flavor and the inserted base flavor in the chamber of the vaping apparatus. An example of a LUT is described in detail in FIG. 11 below.

The user device 820 may be embodied by a cellular phone, a smart phone, a session initiation protocol (SIP) phone, a laptop, a personal digital assistant (PDA), a satellite radio, a global positioning system, a multimedia device, a video device, a camera, a game console, a tablet, a smart device, a wearable device, or any other similar functioning device. In one embodiment, the user device 820 may communicate with the chemical signature engine server 832 to obtain the chemical signature 840. In this embodiment, the user device may forward the chemical signature 840 to the vaping apparatus 810 and/or the printer 882.

The chemical signature engine server 832 and the database 834 may include hardware and software infrastructures that can be resident in the cloud 830. The database 834 may be included in the chemical signature engine server 832. The chemical signature engine server 832 may process the query 890 from the user device 820 or the vaping apparatus 810 to determine the chemical components to be added or combined with the base flavor. In some cases, the chemical signature 840 is generated to implement a cheaper version of the targeted flavor 850 when the raw material components in the second flavor 870 or the third flavor 880 can be bought in bulk at lower prices.

Figure 9:
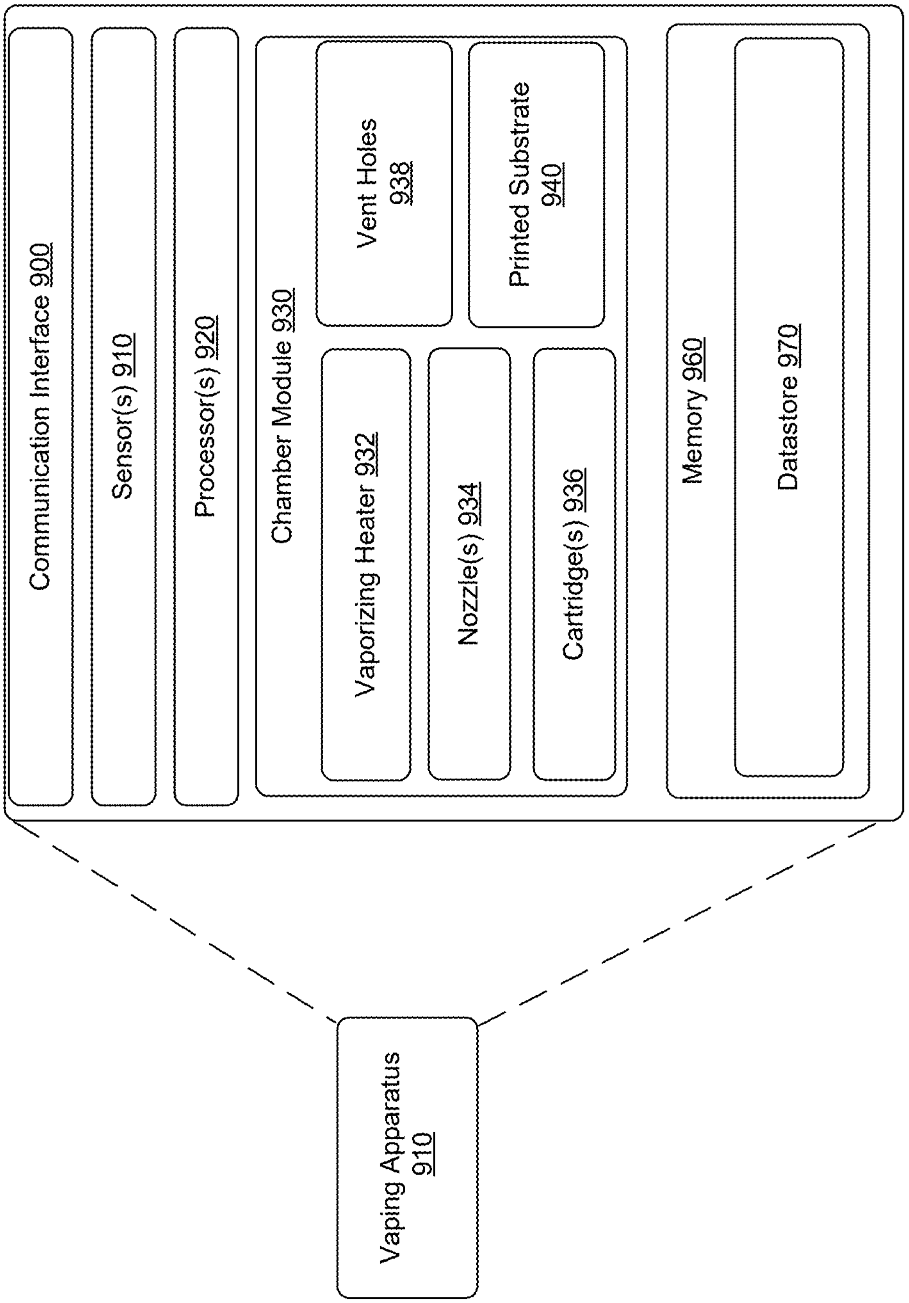
FIG. 9 is a diagram of exemplary components of a vaping apparatus, in accordance with at least one embodiment.

FIG. 9 illustrates an exemplary embodiment of a vaping apparatus that communicates with the chemical signature engine server to receive the chemical signature, which can be used as a reference to generate the targeted flavor. In the illustrated example, the vaping apparatus 810 may include a communication interface 900, sensor(s) 910, one or more processors 920, a chamber module 930, and a memory 960 with a datastore 970. The chamber module 930 may further include a vaporizing heater 932, one or more nozzle(s) 934, one or more cartridge(s) 936, vent holes 938, and a printed substrate 940.

In one example, the vaping apparatus 810 may communicate with the user device 820, chemical signature engine server 832, and/or the printer 882 through the communication interface 900, which can include hardware, software, or a combination of hardware and software to transmit and/or receive data. Communication interface 900 may include a transceiver that facilitates wired or wireless communications through a cellular network or a broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Sensor(s) 910 may include, without limitation, an airflow sensor, power sensor, pressure sensor, and other similar types of sensors that can be used during a vaping operation. For example, the sensor(s) 910 may detect pressure from a mouthpiece (not shown) of the vaping apparatus and in response, the sensor(s) 910 may send this signal to the processor(s) 920 to be used as a reference for activating the heating element in the chamber. In another example, the sensor(s) 910 may detect a time period during which the heating element was activated and compare the time period with a threshold value to automatically shut off power if the threshold value is exceeded, and so on. In these examples, the sensor(s) 910 may send sensor data to the processor(s) 920 for further processing.

Processor(s) 920 may be a central processing unit(s) (CPU), graphics processing unit(s) (GPU), both a CPU and GPU, or any other sort of processing unit(s). Each of the one or more processor(s) 920 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 920 may also be responsible for executing all computer applications stored in the memory, which can be associated with common types of volatile (RAM) and/or non-volatile (ROM) memory. For example, the processor(s) 920 may send the query to the chemical signature engine server. The processor(s) 920 may also process the chemical signature from the chemical signature engine server 832 where the chemical signature may indicate the quantities and types of pre-vapor formulations to be combined. In another example, the processor(s) 920 may use the communication interface 900 to send the sensor data, base flavor, selected targeted flavor, and other vaping apparatus data to the user device, chemical signature engine server, and/or the printer.

The chamber module 930 may include hardware and/or processor-executable software components that control the generation of targeted flavors based upon the corresponding chemical signatures. The chamber module may include an enclosure that receives the wick, oil, the injected pre-vapor formulations, and/or the printed dissolvable substrate. A heating element (not shown) in the chamber may transfer heat to an incoming ambient air that can be drawn through chamber vent holes (not shown) during vaping, which in turn heats the wick, oil, injected pre-vapor formulations, and/or the printed dissolvable substrate by convection. In one example, the chamber module 930 may operate to combine a base flavor with a separate or different flavor to generate a desired or targeted flavor. The base flavor can be derived from a wick that is heated to absorb oil while the combined chemical component may be derived via an injection of one or more pre-vapor formulations into a chamber of the vaping apparatus or insertion of the printed dissolvable substrate into the chamber for vaporization. The base flavor may include tobacco, mint, mango, tropical fruit, cola, or other flavors. The injected pre-vapor formulations or printed dissolvable substrate may include an additional amount of purified cannabinoid, terpene, or a suitable combination thereof.

The vaporizing heater 932 may include a heating element such as a coil that can be energized to transfer heat and vaporize a combination of the injected pre-vapor formulations and the base flavor from the wick in the chamber of the vaping apparatus. The heating element may include surfaces that vaporize the pre-vapor formulations in the chamber. In one example, the processor(s) 920 may use the direction of airflow that indicates blowing air through a mouthpiece of the vaping apparatus and the magnitude of the airflow to trigger the application of heat over the base flavor and the injected pre-vapor formulations. In this example, a detected direction of airflow and use of a threshold value for the magnitude of the airflow may indicate active use of the vaping apparatus such that the vaporizing heater 932 activates the heating element to vaporize the combination of base flavor and the added flavor in the chamber. In one embodiment, the activation of the heating element is variable depending upon the detected magnitude of the airflow in a particular direction. For example, when the magnitude of the airflow exceeds the threshold value, then the vaporizing heater 932 applies heat in the chamber. Otherwise, the vaporizing heater 932 may turn off the heating element when the threshold value is not exceeded.

The one or more nozzles 934 may include injectors that are in fluid communication with a set of reservoirs in which are held different pre-vapor formulations. The first pre-vapor formulation 872, second pre-vapor formulation 874, and third pre-vapor formulation 876 in FIG. 8 may be prepackaged and the one or more nozzles can facilitate the injection of the pre-vapor formulations into the chamber. In one embodiment, the processor may use the chemical signature to control the injection of the pre-vapor formulations by the one or more nozzle(s) 934. For example, the selected target flavor may include an additional 70% of purified cannabinoid per 1 mg of the base flavor. In this example, the chemical signature may include a combination of 0.7 mL of THC, 0.03 mL of purified terpene such as linalool, 0.07 mL of glycerin, 0.2 mL of ethanol, 1 mg of polyvinylpyrrolidone, and 0.1 ml of water to generate an injected pre-vapor formulation that comprises 70% purified cannabinoid by weight and 3% terpene by weight. The 0.1 mL water in this combination may be added in small increments to obtain a viscosity of 1 mPa·s. This combination may be divided into individual doses; for example, a single injection of the combination may provide 10 mg droplet or burst of TCH to the chamber.

The one or more cartridge(s) 936 may include disposable and pre-filled containers that can hold the wick, pre-vapor formulations, oil, and the like. In one embodiment, each of the cartridges may include a distinct label to identify the base flavor that is associated with the cartridge. For example, the label may identify a cartridge to have a tobacco flavor. In some embodiments, the cartridge may also contain the second flavor. In this case, the label may identify the cartridge, for example, to have 70% of *Cannabis* per dosage. In these examples, the processor(s) 920 may be configured to identify the flavors that are associated with the different cartridges based on their respective labels.

The vent holes 938 may be positioned on a lower surface of the vaping apparatus to allow the airflow into the chamber of the vaping apparatus. The vent holes may include a slidable cover that can be configured to allow the airflow upon activation of power of the vaping apparatus. The ambient air of the airflow together with the applied amount of heating in the chamber may vaporize the flavor compounds from the chamber of the vaping apparatus and exit at the mouthpiece. The flavor compounds may include cannabinoid, terpene, tobacco flavors, and similar flavors.

The printed substrate 940 may provide a roll of printed dissolvable substrate that can be inserted into the chamber. The insertion to expose the printed dissolvable substrate may be done manually via a knob (not shown) or through a roller (not shown) that inserts the printed dissolvable substrate in increments to the chamber. The printed dissolvable substrate may be subdivided using perforated substrates where each section may correspond to a dosage that can be combined with the base flavor to generate the targeted flavor.

For example, a dissolvable substrate may be printed with an ink composition that comprises 70% purified cannabinoid by weight and 3% terpene by weight. This ink composition may be derived by mixing 70 mL of THC, 3.0 mL of purified terpene such as linalool, 7 mL of glycerin, 20 mL of ethanol, 100 mg of polyvinylpyrrolidone, and 15 mL of water. In this example, the printed substrate 940 may be subdivided into dosages where each dosage may include 10 mg of THC per individual dosage. Each dosage may be identified through a perforation of the printed substrate. In some instances, each increment in the vaping apparatus or knob step may be preconfigured to insert a particular dosage into the chamber.

Memory 960 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

Datastore 970 may include a repository of identifiers and corresponding combinations between the base flavor, pre-vapor formulations, and/or the compositions of the ink that were printed on the dissolvable substrate. The datastore may further store the configuration of the vaping apparatus and other suitable data pertinent to an operation of the vaping apparatus. In one embodiment, the datastore 970 may utilize a LUT to identify the corresponding chemical signature based upon the detected base flavor and the selected target flavor. The datastore 970 may include a database for different labels of cartridges and their corresponding information, previously selected flavors, and the like. Each prior selected flavor may be associated with an identifier and stored as historical data in the datastore 970. In some embodiments, a machine-learning algorithm may be used on the historical data to statistically determine the combination or combinations that will best generate the desired targeted flavor.

Figure 10:
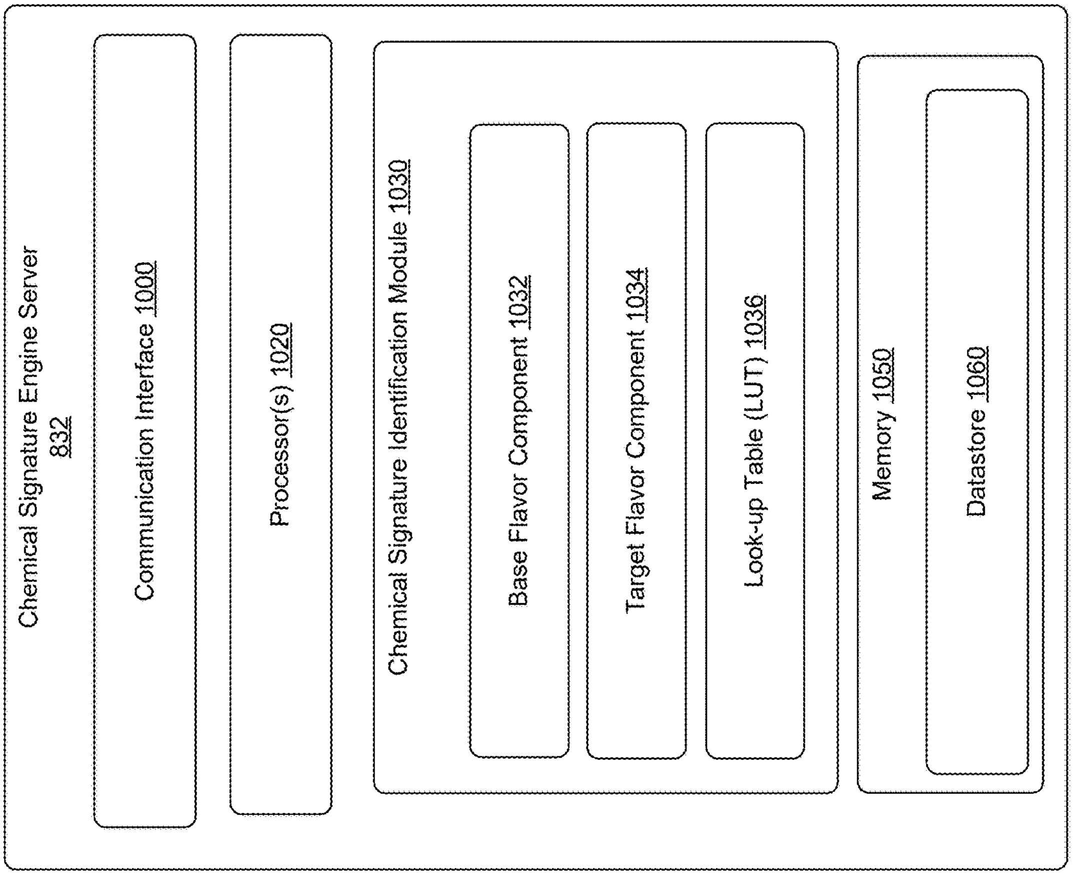
FIG. 10 is a diagram of exemplary components of a chemical signature engine server that supports the on-demand customization of inhalants for vaping, in accordance with at least one embodiment.

FIG. 10 is a block diagram of various components of an example chemical signature engine server 832 that may support the on-demand customization of desired flavors in a vaping apparatus. The chemical signature engine server 832 may be configured to perform an analysis of the targeted flavor and generate the chemical signature that can identify the quantities, components, chemicals, methods, and other data for generating the flavor or flavors to be combined with the base flavor. The chemical signature engine server 832 may include a communication interface 1000, one or more processors 1020, a chemical signature identification module 1030, and a memory 1050. The chemical signature identification module 1030 may further include a base flavor component 1032, target flavor component 1034, and a LUT 1036, in some examples. The memory 1050 also includes a datastore 1060.

In one example, the chemical signature engine server 832 may communicate with the vaping apparatus, printer device, user device that is associated with the vaping apparatus, and/or datastore through the communication interface 1000. The communication interface 1000 may include hardware, software, or a combination of hardware and software that transmits and/or receives data from the user device or vaping apparatus. Communication interface 1000 may include a transceiver that facilitates wired or wireless communications through a cellular network or the broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), etc.

Processor(s) 1020 may be a central processing unit(s) (CPU), graphics processing unit(s) (GPU), both a CPU and GPU, or any other sort of processing unit(s). Each of the one or more processor(s) 1020 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 1020 may also be responsible for executing all computer applications stored in the memory, which can be associated with common types of volatile (RAM) and/or non-volatile (ROM) memory. For example, the processor(s) 1020 may process the query from the user device, vaping apparatus, or the printer. The query may include information such as, e.g., vaping apparatus information, selected targeted data, base flavor, and the like. In another example, the processor(s) 1020 may use the communication interface 1000 to send the notifications to network components such as the vaping apparatus, user device, and the printer.

The chemical signature identification module 1030 may use one or more components to generate the chemical signature based upon the information in the query that can be received from the user device or the vaping apparatus. The information in the query may include the base flavor that is to be loaded or loaded already in the vaping apparatus, the selected flavor, and the desired source of the additional flavor to be added. The desired source can be via the pre-vapor formulations or the printed dissolvable substrate.

The base flavor component 1032 may include a hardware and/or software that can identify the base flavor of the cartridge to be loaded or that is loaded already in the vaping apparatus. In one example, the base flavor component may use the information in the LUT 1036 to identify the base flavor to be associated with the selected target flavor. In this example, base flavor component 1032 may parse data information of the received query to identify the one or more of the requesting vaping apparatuses, the cartridge labels and the associated base flavors, and the like. In this example, each cartridge may be associated with a distinct identification or code included in this data information to determine the type and kind of base flavor that it contains. The base flavor may include tobacco, mint, mango, tropical fruit, cola, or other nicotine flavors.

The target flavor component 1034 may be configured to identify the corresponding chemical signature based upon the selected target flavor. In one embodiment, the received query may include the information about the base flavor of the cartridge that has been loaded into the vaping apparatus. In this embodiment, the target flavor component 1034 may use the base flavor information and the selected target flavor to search the corresponding chemical signature in the LUT 1036. In some embodiments, the received query may only include the information about the selected target flavor because a user is undecided, for example, on the base flavor to load into the vaping apparatus. In this case, the target flavor component may use the LUT to select different base flavors that are associated with the selected target flavor. In these embodiments, the corresponding chemical signatures may include an additional dosage of purified cannabinoid, terpene, or a suitable combination thereof, that can be combined with a particular and identified base flavor.

The LUT 1036 may include information that can be used to identify the corresponding chemical signatures and/or base flavors based upon the selected target flavors. In one embodiment, the LUT may include different chemical signatures for different combinations of the loaded or to be loaded base flavors and selected target flavors. The LUT may also include the labels of the cartridges and identification of the vaping apparatus that can be associated with corresponding target flavors and chemical signatures.

Memory 1050 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 1050 may also include a firewall. In some embodiment, the firewall may be implemented as hardware in the chemical signature engine server 832.

The datastore 1070 may include a repository of identifiers and associated chemical signature specifications, base flavors, and any other data pertinent to an operation of the chemical signature engine server 832. The repository may be or include a database, lookup table, or other construct that enables any of the components described herein to retrieve data by, for example, sending first data to the datastore 1070 and retrieving second data based on the association.

FIG. 11 illustrates an example block diagram of a LUT 1100 that can be used by the chemical signature engine server or the vaping apparatus to determine the chemical signature that includes the formulations and/or printed dissolvable substrate to be combined with the base flavor in the chamber of the vaping apparatus. For illustration purposes, only two types of cartridges are shown; however, additional types such as mango flavor, tropical flavor, or other flavors may be added without affecting the embodiments described herein.

Without limitation, the LUT 1100 may include cartridge labels 1110, corresponding base flavor 1120 for each type of cartridge, different selections for target flavors 1130, and corresponding chemical signatures 1140 for the target flavors. The cartridge labels 1110 may include distinct identifiers for different cartridges. The identifier may be engraved or affixed to the cartridges such as by a stamp or other marking, or using a printed substrate. The base flavor 1120 may include, without limitation, tobacco, mint, mango, tropical fruit, cola, or other flavors, for example. The target flavors 1130 may include a combination of the base flavors and additional chemical components such as the *Cannabis*, terpene, and the like. For example, the medium strength tobacco 1132, high strength tobacco 1134, medium strength mint 1136, and high strength mint 1138 may each include additional compounds such as TCH, glycerin, ethanol, and the like, that can be added to a particular base flavor.

For each selected target flavor, the chemical signatures 1140 may include corresponding predetermined chemical components such as 70% TCH formulations 1142, 70% printed dissolvable substrate 1144, 70% TCH formulations 1146, and 70% printed dissolvable substrate 1148. The 70% TCH formulations 1142 may include injecting pre-vapor formulations comprising of 70 mL of THC, 3.0 mL of purified terpene such as linalool, 7 mL of glycerin, 20 mL of ethanol, 100 mg of polyvinylpyrrolidone, and 15 mL of water to each mg of gin. In one embodiment, the 70% TCH formulations 1142 is pre-packaged, and each burst of nozzle injection may correspond to a particular amount of dosage of the TCH. The 70% printed dissolvable substrate 1144 may include a specification that uses 70 mL of THC, 3.0 mL of purified terpene such as linalool, 7 mL of glycerin, 20 mL of ethanol, 100 mg of polyvinylpyrrolidone, and 15 mL of water to create the ink composition that can be used to create the printed dissolvable substrate, and so on. These chemical signatures are for illustration purposes only and different amounts of *Cannabis*, terpenes, or a combination thereof, can be added and mixed with the base flavor.

Figure 12:
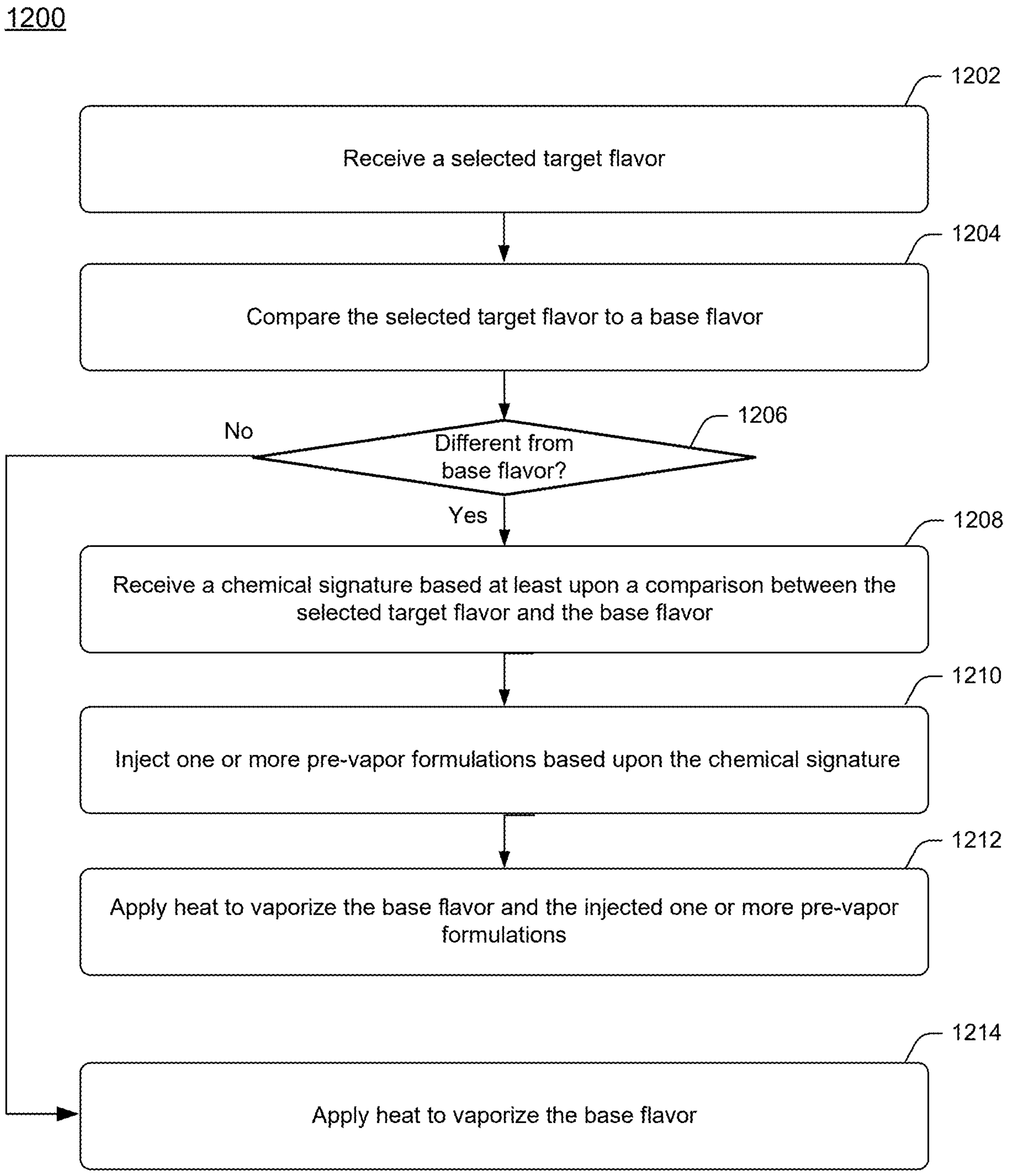
FIG. 12 is a flow diagram of an example methodological implementation for performing the on-demand customization of inhalants for vaping, in accordance with at least one embodiment.

FIG. 12 presents a process 1200 that relates to an on-demand customization of inhalants on the vaping apparatus to generate a targeted flavor. Process 500 illustrates a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, process 500 is described with reference to the context diagram 800 of FIG. 8.

At block 1202, the vaping apparatus may receive a selected target flavor. In one embodiment, the vaping apparatus may be configured to present a selection of target flavors to a user. For example, each target flavor may correspond to a preset radial position of a target flavor wheel that can be rotated to select the target flavor from different target flavors offered by the vapor apparatus. Due to the vaping apparatus' small form factor, the target flavor wheel may include an indicator tab that stops at a predetermined number of preset radial positions where each presented radial position corresponds to a target flavor that can be presented via the user interface and can be selected by the user. In this example, the target flavor may include the combination of the base flavor that can be derived from the wick of a replaceable cartridge and the additional flavor that can be obtained from the pre-vapor formulations or the printed dissolvable substrate.

At block 1204, the vaping apparatus may compare the selected target flavor with a base flavor. The base flavor may include tobacco, mint, mango, tropical fruit, cola, or other flavors. The selected target flavor may include flavors that are different or separate from the base flavor. In a case where the selected target flavor is different from the base flavor ("Yes" at block 1206), then, at block 1208, the vaping apparatus may receive a chemical signature based at least in part on the comparison between chemical components of the selected target flavor and the base flavor. The chemical signature may include an information to enhance the base flavor, which may include an addition of a particular dosage of purified cannabinoid, terpene, or a suitable combination thereof.

At block 1210, the vaping apparatus may inject a preconfigured amount of one or more pre-vapor formulations into a chamber of the vaping apparatus. The chamber in the vaping apparatus may include an enclosure that receives the wick, oil, and injected pre-vapor formulations. A heating element in the chamber may transfer heat to incoming ambient air that can be drawn through chamber vent holes during vaping, which in turn heats the injected pre-vapor formulations and the wick by convection. In one example, the vaping apparatus may utilize one or more nozzles to inject the pre-vapor formulations into the chamber. In one embodiment, the nozzles may be preconfigured to inject a particular dosage of the pre-vapor formulations when heat is applied to the chamber.

For example, the chemical signature specification may require an addition of a 10 mg dosage of cannabinoid to the tobacco flavor. In this example, the nozzle may inject 0.7 mL of THC, 0.03 mL of purified terpene such as linalool, 0.07 mL of glycerin, 0.2 mL of ethanol, 1 mg of polyvinylpyrrolidone, and 0.1 mL of water into the chamber to generate a pre-vapor formulation that comprises 70% purified cannabinoid by weight and 3% terpene by weight. The nozzle may be preconfigured to inject a particular weight of the mixed pre-vapor formulations such as 10 mg per injection.

In some embodiments, a printed dissolvable substrate may be obtained from the ink composition that comprise the combined pre-vapor formulations to generate the particular dosage of purified cannabinoid and terpene. In this embodiment, and following the preceding example, the 0.7 mL of THC, 0.03 mL of purified terpene such as linalool, 0.07 mL of glycerin, 0.2 mL of ethanol, 1 mg of polyvinylpyrrolidone and 0.1 mL of water are well mixed such that all the compounds can be homogeneously dispersed within an ink composition. The ink composition is then loaded into an ink cartridge and printed on a dissolvable substrate that can be used as an alternative to the injection of one or more pre-vapor formulations as described above.

At block 1212, the vaping apparatus may use the vaporizing heater to apply heat in the chamber to vaporize the base flavor and the injected one or more pre-vapor formulations. In one example, during vaping, the vaporizing heater may transfer heat to incoming ambient air that can be drawn through chamber vent holes, which in turn heats the injected pre-vapor formulations and the wick by convection. The heating of the injected pre-vapor formulations and the wick may generate the selected target flavor received at block 1202.

Returning to block 1206, in a case where the selected target flavor is the same as the base flavor, then, at block 1214, the vaping apparatus may use the vaporizing heater to apply heat in the chamber to vaporize the base flavor.

Although subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to remotely render chemical signatures, comprising:

receiving a remote request from a user comprised of a requesting user identifier, a specification of a substrate, and a chemical signature, the chemical signature comprised of identifiers for one or more chemicals comprising a selected set of chemicals, and for each identified chemical at least a quantity of the selected set of chemicals;

sending the remote request to a chemical printer; and based on the received request, controlling infusing a flammable or dissolvable substrate specified by the substrate specification with chemicals corresponding to a targeted experience by the chemical printer printing the chemicals on the substrate, the chemicals being based at least on the chemical signature.

2. The method of claim 1, wherein the chemical printer is one of a plurality of chemical printers, each of the chemical printers being associated with a respective chemical printer profile comprised of a set of chemicals that the associated chemical printer is configured to print; and wherein the directing of the remote request is based at least on a chemical printer's chemical printer profile.

3. The method of claim 1, wherein the request comprises a digital code indicating a right to use the chemical signature in the request, and the method further comprises:

validating the digital code against a data store of digital codes;

wherein the directing the request is contingent on a successful validation of the digital code.

4. The method of claim 3, wherein the validating the digital code includes any one of:

verifying a purchase of the chemical signature in the request;

verifying payment of a subscription to the chemical signature in the request;

verifying the transfer of the chemical signature in the request; or verifying that the chemical signature is a modification of a second chemical signature, and that the requesting user identifier is associated with rights to use the second chemical signature.

5. The method of claim 4, wherein the digital code is a non-fungible token (NFT) of the chemical signature.

6. The method of claim 1, wherein the requesting user identifier is associated with a payment account; and the method further comprises:

debiting the payment account with a printer price, prior to the directing the remote request to the chemical printer;

wherein the directing the request is contingent on a successful debiting of the payment account.

7. The method of claim 1, further comprising:

tagging a printed substrate with a digital tag having a predetermined format;

receiving a digital code scan of input formatted according to the predetermined format;

comparing the digital code scan against the tagged printed substrate; and sending a signal that the tagged printed substrate may be delivered, if the digital code scan is successfully compared against the tagged printed substrate.

8. The method of claim 1, further comprising:

retrieving geolocation information about the requesting user, based at least on the requesting user identifier;

retrieving from a data store of chemical printer establishments, referral information about a set of chemical printer establishments, based at least on the geolocation information; and returning at least some of the retrieved set of referral information of chemical printer establishments.

9. The method of claim 8, wherein each chemical printer establishment has at least one chemical printer, and each chemical printer is associated with a chemical printer profile, the chemical printer profile comprised of a set of chemicals the chemical printer is configured to print; and wherein the retrieving is based at least on the chemical printer profiles.

10. The method of claim 8, wherein the requesting user identifier is associated with a payment account; the method comprising:

debiting the payment account for a payment for providing referral information;

wherein the returning of referral information is contingent on successful payment from the payment account.

11. The method of claim 8, wherein the inclusion of a chemical printer establishment in the retrieved set of referral information is contingent on receiving a prior payment by the chemical printer establishment.

12. The method of claim 8, wherein each chemical printer establishment referral information returned includes an identifier for the chemical printer establishment, and a web address.

13. The method of claim 12, wherein the web address is a link that triggers a routine to automatically forward a request to print to the associated chemical printer establishment.

14. The method of claim 12, comprising:

collecting indicia of use by a plurality of users, including the requesting user, of chemical printer establishments;

performing data analysis of service by the chemical printer establishments based on the collected indicia of use by all of the plurality of users; and generating reports on usage patterns of each of the chemical printer establishments, respectively, based on the data analysis of the collected indicia of use by all of the plurality of users.

15. The method of claim 8, wherein the referral information returned for each chemical printer establishment includes an identifier for the third-party provider, and a web address.

16. The method of claim 15, wherein the request comprises an address of a chemical printer of the requesting user's location, and wherein the web address is a link that triggers a routine to automatically forward a request to print to the chemical printer of the requesting user's location.

17. The method of claim 16, wherein the requesting user is associated with a payment account, the method comprising:

debiting the payment account for a payment for providing referral information; wherein the returning of referral information is contingent on successful payment from the payment account.

18. The method of claim 16, wherein the requesting user is associated with a payment account, the method comprising:

receiving a signal from the chemical printer at the requesting user's location, as to whether printing was successful, debiting the payment account for a payment for providing referral information, contingent on receipt of a signal of a successful print.

19. The method of claim 15, comprising:

collecting indicia of use by a plurality of users, including the requesting user, of third-party chemical signature providers;

performing data analysis of service by the third-party chemical signature providers based on the collected indicia of use by all of the plurality of users; and generating reports on usage patterns of each of the third-party chemical signature providers, respectively, based on the data analysis of the collected indicia of use by all of the plurality of users.

* * * * *